(12) United States Patent
Nakata

(10) Patent No.: US 7,379,876 B2
(45) Date of Patent: May 27, 2008

(54) METHOD AND APPARATUS FOR SPEECH INPUT GUIDANCE

(75) Inventor: Koichi Nakata, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 892 days.

(21) Appl. No.: 10/078,334

(22) Filed: Feb. 14, 2002

(65) Prior Publication Data

US 2002/0120455 A1 Aug. 29, 2002

(30) Foreign Application Priority Data

Feb. 15, 2001 (JP) ............................. 2001-039273
Oct. 9, 2001 (JP) ............................. 2001-311584

(51) Int. Cl.
*G10L 11/00* (2006.01)
*G10L 21/00* (2006.01)
(52) U.S. Cl. .................. 704/275; 704/270.1; 704/273; 701/36
(58) Field of Classification Search ............. 704/270.1, 704/275, 273; 701/36
See application file for complete search history.

(56) References Cited

U.S. PATENT DOCUMENTS

| 4,677,569 | A | * | 6/1987 | Nakano et al. ............. 704/275 |
| 4,723,291 | A | * | 2/1988 | Koike ......................... 704/258 |
| 4,766,529 | A | * | 8/1988 | Nakano et al. ............. 704/275 |
| 4,827,520 | A | * | 5/1989 | Zeinstra .......................... 701/1 |
| 5,101,357 | A | * | 3/1992 | Tempelhof ................. 701/200 |
| 5,125,071 | A | * | 6/1992 | Ozeki ......................... 715/811 |
| 5,177,685 | A | * | 1/1993 | Davis et al. ............. 455/456.5 |
| 5,386,494 | A | * | 1/1995 | White ...................... 704/270.1 |
| 5,479,488 | A | * | 12/1995 | Lennig et al. ........... 379/88.04 |
| 5,598,522 | A | * | 1/1997 | Inatomi ...................... 715/821 |
| 5,729,659 | A | * | 3/1998 | Potter ........................ 704/270 |
| 5,809,447 | A |  | 9/1998 | Kato et al. |
| 5,860,059 | A | * | 1/1999 | Aust et al. .................. 704/231 |
| 5,890,122 | A | * | 3/1999 | Van Kleeck et al. ........ 704/275 |
| 6,192,343 | B1 | * | 2/2001 | Morgan et al. ............. 704/275 |
| 6,208,932 | B1 | * | 3/2001 | Ohmura et al. ............. 701/200 |
| 6,266,614 | B1 | * | 7/2001 | Alumbaugh ................ 701/211 |
| 6,285,924 | B1 | * | 9/2001 | Okamoto et al. .............. 701/1 |
| 6,420,975 | B1 | * | 7/2002 | DeLine et al. ........... 340/815.4 |
| 6,560,576 | B1 | * | 5/2003 | Cohen et al. ............... 704/270 |
| 6,710,789 | B1 |  | 3/2004 | Sekiguchi et al. |
| 6,778,970 | B2 | * | 8/2004 | Au ............................... 706/55 |
| 2001/0052030 | A1 | * | 12/2001 | Shiraishi .................... 709/310 |
| 2002/0120455 | A1 | * | 8/2002 | Nakata ....................... 704/275 |
| 2003/0091176 | A1 | * | 5/2003 | Feldes et al. .......... 379/220.01 |

FOREIGN PATENT DOCUMENTS

EP 1254039 A1 * 11/2002

(Continued)

*Primary Examiner*—David Hudspeth
*Assistant Examiner*—Eunice Ng
(74) *Attorney, Agent, or Firm*—Brinks Hofer Gilson & Lione

(57) ABSTRACT

The operation of a device by a user is detected, and one or more speech input executing commands corresponding to the operated device are provided to the user, e.g., by speech or by being displayed on a screen. Speech input guidance may be stopped if it would interfere with an audio or image output of an operated device, or if a count of guidance speech outputs exceeds a predetermined number.

15 Claims, 17 Drawing Sheets

FOREIGN PATENT DOCUMENTS

| | | | |
|---|---|---|---|
| JP | 04264916 A | * | 9/1992 |
| JP | 05-075576 | | 3/1993 |
| JP | 09-179574 | | 7/1997 |
| JP | 10104010 | * | 4/1998 |
| JP | 11-142178 | | 5/1999 |
| JP | 2000-047784 | | 2/2000 |
| JP | 2000-155594 | | 6/2000 |
| JP | 2000-266558 | | 9/2000 |
| JP | 2001-022370 | | 1/2001 |
| JP | 2001116581 | * | 4/2001 |
| JP | 2001-216129 | | 8/2001 |

* cited by examiner

FIG.2

SPEECH INPUT GUIDANCE DATA

| SPEECH COMMAND INDEX | SPEECH COMMAND | OPERATION MEANS OTHER THAN SPEECH | GUIDANCE EXAMPLE | COUNT VALUE | | |
|---|---|---|---|---|---|---|
| | | | | SPEECH GUIDANCE | GUIDANCE DISPLAY | SPEECH INPUT EXECUTION |
| 1 | CURRENT POSITION | INDICATE "CURRENT POSITION" BUTTON WITH CURSOR | SPEECH COMMAND "CURRENT POSITION", IS AVAILABLE FOR CURRENT POSITION OPERATION | i(1) | j(1) | h(1) |
| 2 | ZOOM IN | INDICATE "ZOOM IN" BUTTON WITH CURSOR | SPEECH COMMAND, "ZOOM IN", IS AVAILABLE FOR ZOOM IN OPERATION | i(2) | j(2) | h(2) |
| 3 | TELEPHONE NUMBER | INDICATE "SEARCH BY TELEPHONE NUMBER" BUTTON WITH CURSOR | SPEECH COMMAND, "TELEPHONE NUMBER", IS AVAILABLE FOR SEARCH BY TELEPHONE NUMBER OPERATION | i(3) | j(3) | h(3) |
| ... | ... | ... | ... | ... | ... | ... |
| m | UP VOLUME | TURN VOLUME KNOB CLOCKWISE | SPEECH COMMAND, "UP VOLUME" IS AVAILABLE FOR TURNING UP SOUND VOLUME OPERATION | i(m) | j(m) | h(m) |
| ... | ... | ... | ... | ... | ... | ... |
| n | ... | ... | ... | i(n) | j(n) | h(n) |

FIG.13

| SPEECH INPUT GUIDANCE FOR OPERATION CONTENT | SPEECH INPUT GUIDANCE ACCUMULATED DATA | | |
|---|---|---|---|
| | COMMAND | COMBINED WITH | PARAPHRASED BY |
| TURN UP SOUND VOLUME OF AUDIO | UP SOUND VOLUME | — | — |
| TURN UP SOUND VOLUME OF AUDIO | TURN UP SOUND VOLUME | — | — |
| TURN UP SOUND VOLUME OF AUDIO | UP VOLUME | — | — |
| ..... | ..... | ..... | ..... |
| PROVIDE SPEECH OR SCREEN FOR COMMAND PARAPHRASING, AND OPERATION CONTENTS TO BE COMBINED WITH OPERATION OBJECT, "SOUND VOLUME" | SOUND VOLUME | — | VOLUME |
| | | UP | — |
| | | TURN UP | — |
| | | DOWN | — |
| | | TURN DOWN | — |
| PROVIDE SPEECH OR SCREEN FOR COMMAND PARAPHRASING, AND OPERATION CONTENTS TO BE COMBINED WITH OPERATION OBJECT, "VOLUME" | VOLUME | — | SOUND VOLUME |
| | | UP | — |
| | | TURN UP | — |
| | | DOWN | — |
| | | TURN DOWN | — |

FIG.14(a)

| SPEECH INPUT GUIDANCE FOR OPERATION CONTENT | SPEECH INPUT GUIDANCE ACCUMULATED DATA ||
|---|---|---|
| | COMMAND | COMBINED WITH |
| SEND MAIL | TRANSMIT MAIL | — |
| | SEND MAIL | — |
| RECEIVE MAIL | RECEIVE MAIL | — |
| | GET MAIL | — |
| ⋮ | ⋮ | ⋮ |
| PROVIDE SPEECH OR SCREEN FOR LIST OF OPERATION CONTENTS TO BE COMBINED WITH OPERATION OBJECT, "MAIL" | MAIL | TRANSMIT |
| | | SEND |
| | | RECEIVE |
| | | GET |
| | | READ |
| | | STORE |
| | | SAVE |
| | | ⋮ |

FIG.14(b)

| SPEECH INPUT GUIDANCE FOR OPERATION CONTENT | SPEECH INPUT GUIDANCE ACCUMULATED DATA ||
|---|---|---|
| | COMMAND | COMBINED WITH |
| SHOW VICS CHARACTER INFORMATION | VICS CHARACTER INFORMATION | — |
| SHOW VICS GRAPHIC INFORMATION | VICS GRAPHIC INFORMATION | — |
| ⋮ | ⋮ | ⋮ |
| PROVIDE SPEECH OR SCREEN FOR LIST OF OPERATION CONTENTS TO BE COMBINED WITH OPERATION OBJECT, "VICS" | VICS | CHARACTER INFORMATION |
| | | GRAPHIC INFORMATION |
| | | ⋮ |

METHOD AND APPARATUS FOR SPEECH INPUT GUIDANCE

BACKGROUND OF THE INVENTION

1. Field of the Invention

The present invention relates to a speech input guidance method for notifying a user of features that are operational by speech for a speech input device for allowing various types of device operations by speech, and a speech input guidance apparatus for executing this method.

2. Description of the Prior Art

As a result of recent diversifying features of various types of devices, a single device can include an extremely wide variety of features and provide a user of the device with great convenience. On the other hand, because it is necessary for a user to select an operation unit which provides a specific feature from many operation units, such as switches, and to operate the operation unit to enter an operation instruction, the difficulty of selecting an operation unit and remembering an order of an operation increases. As a result, the number of devices for setting an order of displayed features from a higher priority on a liquid crystal display, for example, allowing a user to select a displayed feature with a touch panel or a cursor indication of a remote controller, and finally conducting the specific feature is increasing.

For example, a desired destination setting means allows a selection from among various methods, such as finding a specific place while scrolling to display from a wide area map to a zoomed map sequentially, narrowing down sequentially from a state or a prefecture to a specific place, entering a phone number, entering a zip code to show a map for a neighborhood of a specific place and finding the place while scrolling the map, specifying a category of a specific facility, and then specifying an area to search for the facility, selecting from a list of places which were previously set as destinations, visited, or registered, and using alphabet keys for direct entry. Operations are provided on selection screens and scroll screens displayed sequentially for the individual means, the specific place is found, and finally the place is established on a vehicle onboard navigation device.

It is a proper method for operating many features to specify precisely a desired feature from among many features, and to conduct a setting operation for this feature while various selection screens are being shown. However, as features become further diversified and complicated, it becomes ambiguous what operations are to be sequentially conducted for a desired operation, and it is required to repeat various operations for the setting.

Because a user who operates vehicle onboard devices such as a vehicle navigation device or a vehicle audio device is most often a driver, it is required for the user to operate these vehicle onboard devices so that the operation does not affect driving, which the driver should concentrate on most. However, as the different types of devices have included more functions as described above, because it is virtually impossible for a user to select and to operate a desired feature button from many feature buttons, or to conduct an operation for sequentially selecting function menus shown on a screen, the user has to do so while stopped.

As a consequence, it is gradually becoming common to introduce speech recognition technology, which has been researched and developed rapidly in recent years, for providing an instruction by means of speech for different types of operations. With this technology, when the phrase "Nearby Seven-Eleven" is simply uttered while a speech input device is being ON, a navigation device recognizes "nearby", determines that a search for a specific facility is requested, also determines that a search area should be as close to a current position as possible, and selects a search range so as to search on a guide route as much as possible, and simultaneously in an area ahead of the current position when it is discriminated that this vehicle is traveling along the guide route. The navigation device recognizes a phrase, "Seven-Eleven", to search by category, selects a convenience store category from different types of categories, and searches for facilities of "Seven-Eleven" in the category. When a search result is obtained, the result is shown on a map on a screen based on position data, and guidance such as "There is a Seven-Eleven on the left side 700 m ahead" is provided by speech if necessary.

SUMMARY OF THE INVENTION

Because speech recognition technology allows uttering a short phrase to easily select a specific operation as described above, is extremely convenient, and it is important to apply this technology to a vehicle onboard device in terms of safe driving, this speech recognition technology is rapidly becoming common among current vehicles.

However, though it is extremely convenient to use the speech recognition technology for instructing an operation on different types of devices if this technology is well known, unless a user knows that just uttering "nearby" begins a search by facility, and narrows down a search range selection as the example described above, the user utters "Facility search", "Category selection", "Convenience store", "Seven-Eleven", and "On guide route" in this sequence, for example, in the same way as the user may select the conventional screen display, and the native convenient features are not utilized.

In addition, because it is often not possible that all features are operated by speech, it is often the case that the function range depends on individual devices or types of models of the devices as one audio device allows a speech operation of "Up volume", while another device does not. It is often the case that in which range a device currently used allows the speech operation, or what phrases are available for operation instructions is not clear, and a user does not often use features for an easy speech operation while they are available.

There is also a problem that although a user uses a model which may not offer a feature by speech as described above to turn up a volume, the user repeats "Up volume!" loudly, and becomes irritated with the fact that the device does not understand the utterance, loses confidence in the speech recognition device, and instructs an operation by speech less often. It is only possible to understand what phrases can operate which features after consulting an operation manual of a device many times, or repeating by trial and error for a long period.

In case of operation instruction guidance by means of a screen display as described above, because the operation instruction is given while following guidance sequentially shown on a screen based on a tree structure of operation instructions, and the operation instruction is given based on logical thinking, repeating an operation to return to an original state allows finally correcting errors while there are more or less errors, and a user can easily remember a correct operation. On the other hand, when an operation instruction is given through speech, because it is often the case that a tree structure of the operation instruction is unknown, what should be uttered first for setting a destination on a navigation device is not clear, for example, and even if a phrase, "Set a destination" may start the feature, what should be uttered next is unknown, the operation instruction means with speech recognition is practically unavailable.

While a device constitution and an internal hardware constitution remain the same, only software for operating them may be changed to update a device for adding features on recent electronic devices. In this case, a part where an operation instruction by speech was unavailable comes to offer this function, or a familiar command for speech guidance may change. Thus, unless a user reads thoroughly an instruction manual on an input device with speech recognition, the user will not know the feature, and there is no means for making the user familiar with new speech guidance functions and features.

Setting phrases used for speech instructions on the conventional speech recognition devices still has many problems as described above, and the conventional devices have aspects which are not friendly for users. It is expected to develop a device which uses a proper method to guide a user to phrases for operations by speech on a device currently used if the user does not know the phrases, and makes the user familiar with the operation through speech input.

An isolated word speech recognition system which treats a word as a unit is often used to reduce a load of speech recognition processing, and to increase the speech recognition rate on currently used speech recognition devices. When a user utters a phrase, "Up sound volume", this phrase comprises a "sound volume" of an audio device for representing an operation object, and "up" which indicates an operation instruction for how to operate the operation object. A processing to separate this phrase is not conducted on a speech recognition device for reducing a speech recognition processing load as described above, recognizes "Up sound volume" as one phrase, and selects the closest data among data registered and accumulated in advance.

However, it is possible that a user may use various expressions such as "Up volume", "Turn up sound volume", "Turn up volume", "Increase sound volume" and "Increase volume" in addition to "Up sound volume" when the user turns up a sound volume on an audio device as described above. This remains true in other speech instructions, and there may be at least several to dozens of expressions for speech input for various types of operation instructions.

Because the speech recognition devices currently used have problems in a memory capacity for registering all of these expressions in advance, and a processing capability load for reading out data of the phrases, and comparing them with entered speech data, and a recognition error tends to occur in conjunction with these problems, it is often set so as to conduct one operation with only one phrase such as "Up sound volume" as the example before.

In this case, unless a user knows the phrase, the user cannot provide an operation instruction by speech, and as long as the user tries a speech input with a combination of a phrase "volume" and a phrase "turn up", the user will never operate the device. When "Up volume" is uttered, the speech recognition device may recognize it as an operation instruction for another device similar to this device, and malfunction. Particularly when the user used the phrase "Up volume" for an operation on a different device or a previous version of the device, the user tends to utter wrong phrases, and the device becomes difficult to use.

It is expected to develop a device which can provide guidance on what phrases are available for operations if a user uses a speech input to specify an operation object such as "sound volume", or a category of an operation object such as "VICS information" among traffic guidance features on a navigation device when the user uses a speech recognition device. It is also expected to develop a device which shows a list of phrases available for operations with speech input in an understandable way as needed according to the familiarity of a user with the device.

The present invention provides guidance on what phrases are available for an operation on a device provided with a speech input device for accepting operation instructions for different types of features by speech when a user manually conducts the operation, and properly shows a user a list of phrases available for a speech input when necessary so that the user easily understands the speech input feature, and becomes comfortable with the device.

A speech input guidance method of the present invention comprises the steps of detecting a device operation of a user, searching for a speech input executing command corresponding to the device operation from a speech input guidance data accumulating unit, and providing the user with searched speech input guidance.

A speech input guidance device for conducting the speech input guidance method relating to the present invention comprises a device operation detecting unit for detecting a device operation of a user, a speech input guidance data accumulating unit for recording speech input guidance data for guiding to a command to be executed by means of speech for device operations categorized by device operation type, a data searching unit for searching for, and providing speech input guidance data corresponding to the device operation detected by the device operation detecting unit from the speech input guidance data accumulating unit, and a speech input guidance output unit for providing the user with data searched by the data searching unit.

An alternative speech input guidance device relating to the present invention is characterized in that the speech input guidance output unit is provided with at least one of a guidance speech output unit for guiding by speech, and a guidance screen display output unit for showing guidance on a screen.

An alternative speech input guidance device relating to the present invention is characterized in that the device operation detecting unit detects at least one of a switch operation, a rotary encoder operation, a touch panel operation, and a cursor operation.

An alternative speech input guidance device relating to the present invention further comprises a speech input guidance controlling unit for providing whether speech input guidance is conducted or not, and is characterized in that the speech input guidance is stopped when the speech input guidance controlling unit provides an output for stopping the speech input guidance.

An alternative speech input guidance device relating to the present invention is characterized in that the speech input guidance controlling unit stops the speech guidance when an action of a device for providing a speech output including an audio device is detected.

An alternative speech input guidance device relating to the present invention is characterized in that the speech input guidance controlling unit stops the speech guidance when an action of a radio is detected.

An alternative speech input guidance device relating to the present invention is characterized in that the speech input guidance controlling unit stops the speech guidance when an action of route guidance by speech of a navigation device is detected.

An alternative speech input guidance device relating to the present invention is characterized in that at least one of guidance with a screen and a confirmation sound for indicating that a speech input is available is provided when the speech guidance is stopping.

An alternative speech input guidance device relating to the present invention is characterized in that when route guidance for a navigation device is shown on a guidance display screen, the speech input guidance controlling unit stops guidance on the same screen.

An alternative speech input guidance device relating to the present invention further comprises a data recording unit for recording counts of the outputs categorized by the device operation type from the speech input guidance output unit into the speech input guidance data accumulating unit, and is characterized in that the speech input guidance controlling unit uses the data searching unit to search for/receive a count of outputs corresponding to a device operation, and stops the speech input guidance when the count of outputs exceeds a predetermined number.

An alternative speech input guidance device relating to the present invention is characterized in that a count of guidance speech outputs, and a count of a guidance screen display outputs are recorded separately into the data recording unit, the speech input guidance controlling unit stops entire guidance when either one of the counts exceeds a predetermined number, stops only the guidance speech output when the count of guidance speech outputs exceeds a predetermined number, or stops only the guidance screen display output when the count of guidance screen display outputs exceeds a predetermined number.

An alternative speech input guidance device relating to the present invention further comprises a speech input execution detecting unit for detecting a speech input for a device operation, and a data recording unit for recording counts of the speech inputs categorized by the device operation type based on signals detected by the speech input execution detecting unit into the speech input guidance data accumulating unit, and is characterized in that the speech input guidance controlling unit uses the data searching unit to search for/receive a count of speech inputs corresponding to a device operation, and stops the speech input guidance when the count of speech inputs exceeds a predetermined number.

An alternative speech input guidance device relating to the present invention comprises a speech input guidance data accumulating unit for recording speech input executing commands categorized by operation object, a speech input guidance output request detecting unit for detecting a speech input guidance output request from a user, a data searching unit for searching for and providing data in the speech input guidance data accumulating unit according to an output from the speech input guidance output request detecting unit, and a speech input guidance output unit for providing speech input executing commands searched by the data searching unit as either one of a screen and a speech.

An alternative speech input guidance device relating to the present invention is characterized in that the speech input guidance data accumulating unit records speech input executing commands for indicating an operation object, and commands for a speech input for indicating a content of an operation applied to the operation object while they are being associated with each other, when the speech input guidance output request detecting unit detects that a user enters only either one of the speech input executing command for indicating an operation object, and the speech input executing command for indicating an operation content, it provides the command, the data searching unit searches for and provides a speech input executing command for indicating an operation object, or a speech input executing command for indicating an operation content corresponding to the speech input executing command detected by the speech input detecting unit from the speech input guidance data accumulating unit.

An alternative speech input guidance device relating to the present invention is characterized in that the speech input guidance data accumulating unit records speech input commands for paraphrasing the individual speech input executing commands, and the speech input guidance output unit provides paraphrasing speech input executing commands corresponding to an entered speech input executing command.

An alternative speech input guidance device relating to the present invention is characterized in that the speech input guidance data accumulating unit records at least one of counts of outputs from the speech input guidance output unit, and dates of the outputs for individual speech input executing commands, and the speech input guidance output unit changes the order of guidance, and provides it according to at least one of the count of outputs and the dates of outputs.

An alternative speech input guidance device relating to the present invention is characterized in that the speech input guidance data accumulating unit records counts of outputs from the speech input guidance output unit for individual speech input executing commands, and if the count for a speech input executing command is more than a predetermined number, the speech input guidance output unit provides a guidance output of that command in a form different from that of the other commands, or stops the output.

An alternative speech input guidance device relating to the present invention comprises a speech input guidance data accumulating unit for recording speech input executing commands and mutual correspondences among the speech input executing commands, a speech input detecting unit for detecting/providing a speech input operation by a user, a data searching unit for searching for/providing speech input executing commands relating to the entered speech input executing command based on an output from the speech input detecting unit, and a speech input guidance output unit for providing the speech input executing commands searched by the data searching unit as at least one of a screen and speech.

An alternative speech input guidance device relating to the present invention further comprises a speech input executing command indicating means for specifying one of the speech input executing commands provided on the screen from the speech input guidance output unit, and a device operation means for conducting an operation specified by the speech input executing command indicating means.

BRIEF DESCRIPTION OF THE DRAWINGS

FIG. 2 is a table illustrating an example of accumulated data in a speech input guidance data accumulating unit used in the present invention;

FIG. 13 is a table illustrating an example of speech input guidance data used in the embodiment above;

FIG. 14 illustrates an alternative example of speech input guidance data used in the embodiment above;

DESCRIPTION OF THE PREFERRED EMBODIMENT

Figure 1:
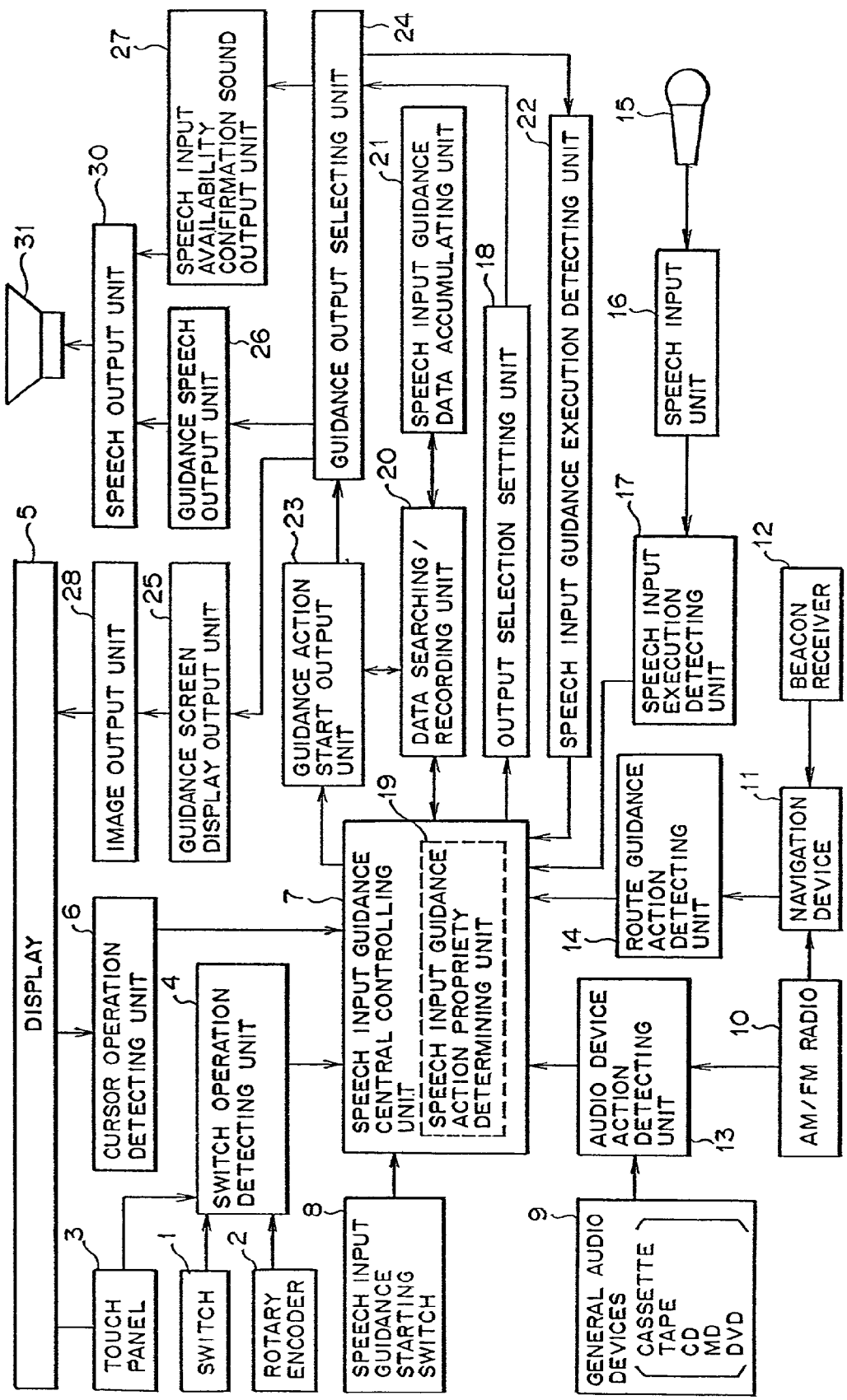
FIG. 1 is a functional block diagram for one embodiment of the present invention.

Embodiments of the present invention are described in reference to the following drawings. FIG. 1 is a functional block diagram of the major functional units of a speech input guidance device for providing guidance by speech input according to the present invention, and their mutual relationships, and specifically shows an example where a speech input device is mounted for operating an onboard vehicle device through speech.

The embodiment shown in the drawing is provided with different types of devices such as an air conditioner in addition to different types of audio devices, and a navigation device, and the individual devices are provided with many operation switches 1 for operating these devices. These devices are further provided with a rotary encoder 2 as a rotary knob for adjusting a sound volume and setting a receiving frequency, and an operation instruction signal output unit for direct operation by means of a finger touch of a user such as a touch panel 3 provided on a display 5 such as a liquid crystal panel, and a switch operation detecting unit 4 detects them as direct instruction signals from a user.

A cursor operation detecting unit 6 is provided to detect a sequential color change or a bright flashing conducted by a cursor indication through a remote controller on different types of selective input portions shown on the display 3, and provides a speech input guidance central controlling unit 7 with detected results as well as the switch operation detecting unit 4. These switch operation detecting unit 4 and cursor operation detecting unit 6 correspond to a device operation detecting unit of the present invention.

The speech input guidance central controlling unit 7 performs an overall control of the speech input guidance of the present invention, is provided with a speech input guidance action propriety determining unit 19, and provides a guidance action start output unit 23 with an action start signal when the speech input guidance action propriety determining unit 19 determines to provide guidance for a speech input. The guidance action start output unit 23 uses a data searching/recording unit 20 to search for data on speech input phrases corresponding to entered operation signals for the switches and the cursor in a speech input guidance data accumulating unit 21 described later, and provides a speaker 31 from a speech output unit 30, or a display 5 from an image output unit 28 with the resulting obtained data for the speech input guidance in different forms described later, thereby providing guidance for a user indicating that a speech input for the operation is available, and what phrases are available for the operation.

The speech input guidance central controlling unit 7 is connected with a speech input guidance starting switch 8. When a user operates this switch, speech input guidance corresponding to the different types of input operations conducted later are provided under predetermined conditions, and the user operates this switch again to stop the action of speech input guidance. It is also possible to provide the speech input guidance when this speech input guidance starting switch 8 is not operated, and to stop the guidance when this switch is operated for the first time, which is the inverse of the previous description.

Audio devices such as general audio devices 9 for a cassette tape, a CD, an MD, and a DVD, and an AM/FM radio 10 are installed in the embodiment shown in the drawing, an audio device action detecting unit 13 detects activity for them, and the speech input guidance action propriety determining unit 19 in speech input guidance central controlling unit 7, which receives a detected result, can stop the speech input guidance to prevent interfering with the listening of a user if necessary when the audio device is operating. Particularly because a user often listens to important traffic information or news on the AM/FM radio 10, it is possible to stop the speech input guidance when the AM/FM radio 10 is in a receiving state even if the speech input guidance is set to on when the other audio device is operating.

The depicted embodiment is an example including a navigation device 11. A beacon receiver 12 is connected with the navigation device 11, VICS information from beacons is received, and VICS information provided through an FM multiplex broadcast is received on the AM/FM radio 10. A route guidance action detecting unit 14 detects the occurrence of different types of speech guidance relating to a traveling route provided from the navigation device 11 such as intersection guidance, traffic congestion information, and traffic accident information, an output of an image for the intersection guidance, and a detailed display for the traffic accident information, and provides the speech input guidance central controlling unit 7 with the detected results.

The speech input guidance action propriety determining unit 19 in speech input guidance central controlling unit 7 conducts processing such as stopping the speech input guidance while the navigation device 11 provides a user with important guidance, and stopping a screen display for the speech input guidance when an image for the intersection guidance is shown. It is possible to set the operation such that an output selection setting unit 18 receives the signal to stop the speech guidance, and to provide guidance with only a screen, or to provide a beep or pip sound as a speech input availability confirmation sound from a speaker or a buzzer in the situations described above if necessary.

A speech input execution detecting unit 17 is connected with the speech input guidance central controlling unit 7, and the speech input execution detecting unit 17 receives a signal from a speech input unit 16 when a user uses a microphone 15 to operate different types of devices by speech, provides a data searching/recording unit 20 with the signal, searches for data in the speech input guidance data accumulating unit 21 as shown in FIG. 2, adds one to h(m), which shows a speech input execution count, and corresponds to an index of the entered speech command in data, and updates it.

This data is used in the speech input guidance action propriety determining unit 19 to determine that it is not necessary to provide speech input guidance if the data searching/recording unit 20 searches for these data in the speech input guidance data accumulating unit 21, and it is determined that a user has already used a phrase more than a predetermined count (p) to operate a device in a situation where if a user operates a switch to provide an operation instruction, guidance that there exists a speech input means corresponding to the operation is provided.

When the speech input guidance action propriety determining unit 19 determines to provide guidance for a speech input, the guidance action start output unit 23 accesses the data searching/recording unit 20, and obtains data indicating what speech inputs can conduct the operation from the speech input guidance data accumulating unit 21 as described before. The guidance action start output unit 23 provides a guidance output selecting unit 24 with the speech input guidance data, and a selection of a guidance output is switched based on the output selection setting unit 18 which operates based on an instruction from the speech input guidance central controlling unit 7.

The switching selection roughly includes a selection of whether sound is provided from the speaker 31, or an image is provided from the display 5, and a selection of whether guidance by speech is provided from a guidance speech output unit 26, or guidance with a beep or a pip sound is provided from a speech input availability confirmation sound output unit 27 when the speaker 31 provides a sound.

When speech input guidance is provided in this way, a speech input guidance execution detecting unit 22 detects an action of the guidance output selecting unit 24 to detect whether an image output or a speech output is conducted, and provides the speech input guidance central controlling unit 7 with the result. The speech input guidance central controlling unit 7 provides the data searching/recording unit 20 with the result, adds one to a speech guidance counter i(m) corresponding to a speech command index provided this time, or a guidance display counter j(m) in data in the speech input guidance data accumulating unit 21 as shown in FIG. 2, and updates the data.

The speech input guidance central controlling unit 7 reads these data through the data searching/recording unit 20 if necessary, and it is possible to stop the speech input guidance, and to avoid annoying a user when speech guidance or image guidance has repeated more than (k) times, for example, because it is probable that the user operates a switch while the user has already known of the existence of guidance.

The guidance output selecting unit 24 provides different types of output unit selected based on the instruction from the output selection setting unit 18 with data for the speech input guidance, provides a phrase such as "Speech command, "Current position", is available for current position operation" from the speaker 31 through the guidance speech output unit 26, and provides a similar indication on the display 5 through the image output unit 28 from a guidance screen display output unit 25. The output selection setting unit 18 instructs an output selection according to various conditions as described above, and provides guidance in different forms such as stopping speech guidance from the speaker, and displaying only an image, or providing only speech guidance, or stopping speech guidance, and providing a speech input availability confirmation sound such as a beep sound.

The speech input guidance action propriety determining unit 19, which is a center of the operation in speech input guidance central controlling unit 7 in the speech input guidance device comprising function blocks described above, finds a speech command index corresponding to an operation when the switch operation detecting unit 4 or the cursor operation detecting unit 6 provides an input for indicating that a user instructs the operation, reads in speech input guidance data corresponding to the command index from the speech input guidance data accumulating unit 21 through the data searching/recording unit 20, provides the guidance output selecting unit 24 with the data through the guidance action start output unit 23, and provides guidance from an output unit prescribed by the output selection setting unit 18.

At this time, a speech input execution count which is counted after a detection at the speech input guidance starting switch 8, the audio device action detecting unit 13, the route guidance action detecting unit 14, or the speech input execution detecting unit 17, and a guidance output count which is counted after a detection at the speech input guidance execution detecting unit 22 are detected as conditions for the speech input guidance, and the speech input guidance central controlling unit 7 determines whether to provide speech input guidance and what means to use for the guidance.

Figure 3:
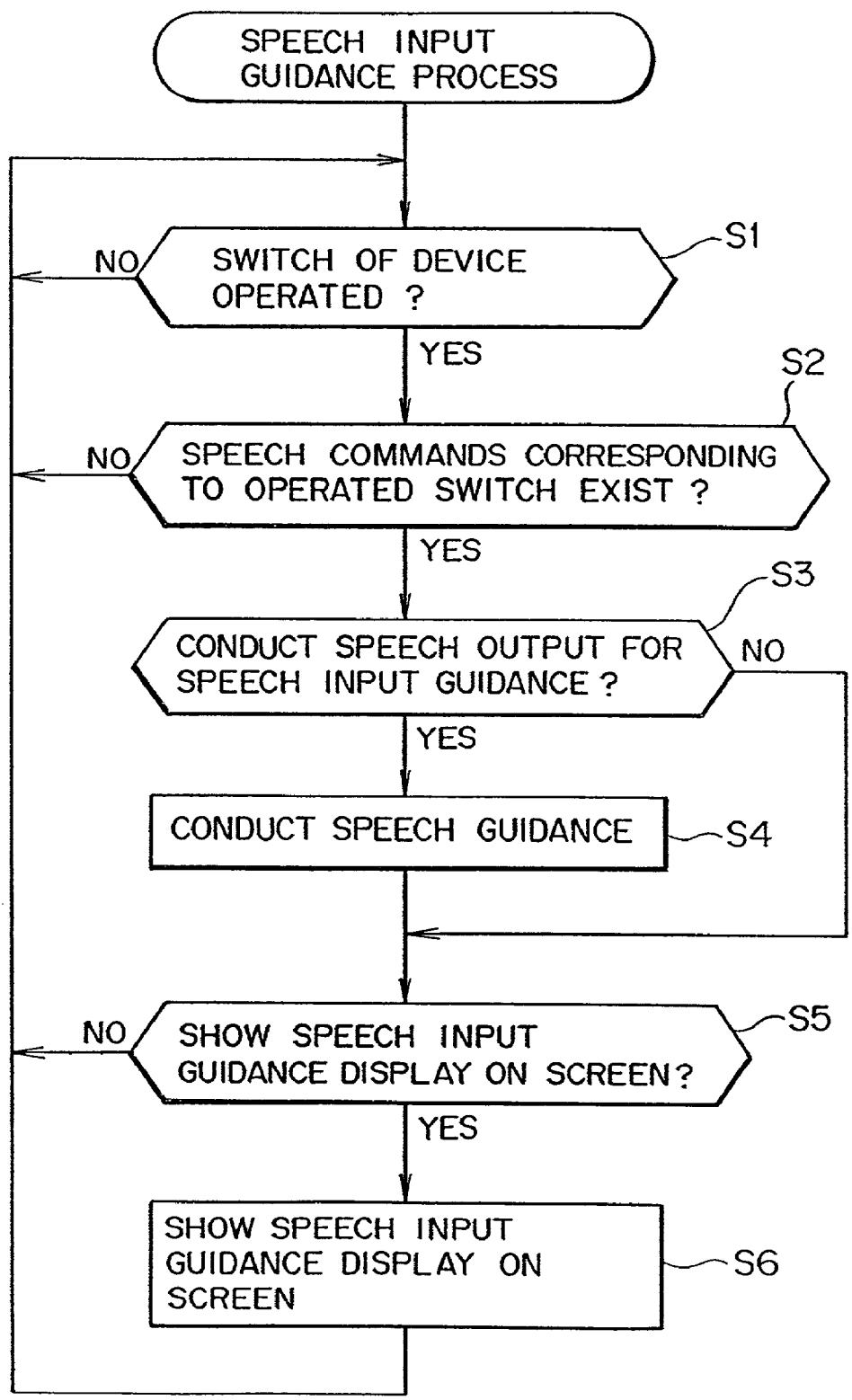
FIG. 3 is a basic operational flowchart of an embodiment of the present invention where speech input guidance is conducted as a result of the operation of a switch of a device.

For example, when the speech input guidance central controlling unit 7 receives an input from the switch operation detecting unit 4 in FIG. 1 in the speech input guidance device described above, a basic process is conducted following an operational flow shown in FIG. 3. The following section provides a description while referring to the functional block diagram shown in FIG. 1. It is determined whether a switch for a device is operated or not in the speech input guidance process (Step SI). This process is conducted such that the switch operation detecting unit 4 detects an operation on the different types of switches 1, a volume adjustment on the rotary encoder 2, a rotating operation for selecting a channel, and a pressing on the touch panel 3 on the surface of display 5, and provides the speech input guidance central controlling unit 7 with the detected result.

If Step S1 determines that a switch for the device has not been operated, Step S1 is repeated until a switch for a device is operated. If Step S1 determines that a switch for the device has been operated, it is determined whether a speech command corresponding to a function of the operated switch exists (Step S2). This process is conducted such that the speech input central controlling unit 7 searches for data in the speech input guidance data accumulating unit 21 through the data searching/recording unit 20, and detects whether data for speech input guidance corresponding to the switch function exist in the speech input guidance data accumulating unit 21.

If Step S2 determines that there is no speech command corresponding to the function of operated switch, because the speech input guidance of the present invention cannot be provided, the procedure returns to Step S1, and waits for a next switch operation. If Step S2 determines that there is a speech command, it is determined whether a speech output for the speech input guidance will be provided (Step S3). This process is conducted such that it is determined not to provide a speech output when at least the speech guidance starting switch 8 is off in FIG. 1, and it is determined not to provide a speech output when it is set in advance that speech input guidance should not interfere with speech guidance for turning left/right at an intersection when the route guidance action detecting unit 14 in navigation device 11 is providing the speech guidance for turning left/right at an intersection. These different types of conditions for whether speech input guidance is conducted by speech or not are described further below.

If Step S3 determines to conduct a speech output for the speech input guidance, speech guidance is provided (Step S4). This process is conducted such that the speech input guidance central controlling unit 7 reads in data from the speech input guidance data accumulating unit 21 through the data searching/recording unit 20, provides the guidance action start output unit 23 with the data, and provides the data from the speaker 31 as described before. If Step S3 determines not to conduct a speech output for the speech input guidance because the speech input guidance starting switch is off, the procedure proceeds to the next step, Step S5.

The next step, Step S5, determines whether a speech input guidance display is shown on the screen. This process is conducted such that it is determined not to provide a speech output when at least the speech input guidance starting switch 8 is off in FIG. 1, and it is determined not to provide an image output when it is set in advance that an image display which interferes with an information display for turning left/right at an intersection is not provided on the same screen when the navigation device 11 is providing the information display for turning left/right at an intersection as described above. These different types of conditions for whether an image output is provided or not are described further below.

If Step S5 determines not to provide a speech input guidance display on a screen, the procedure returns to Step S1, and waits for a next switch operation. If the speech input guidance starting switch 8 in FIG. 1 is off, Step S3 determines that a speech output for the speech input guidance is not to be provided, and if Step S5 similarly determines that a speech input guidance display is not to be shown on the screen, the speech input guidance is not provided at all, and it is possible to independently determine whether the speech input guidance starting switch is on or off, and to conduct a similar processing.

Figure 11A:
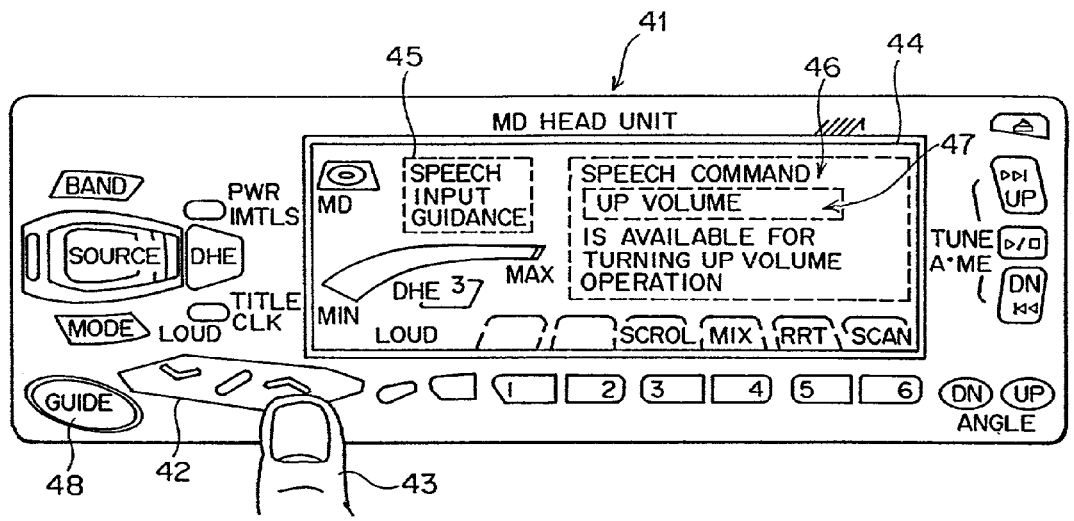
FIG. 11 illustrates examples of a screen display when the present invention is installed in an actual device, where (a) indicates an example of speech input guidance shown when a switch is operated to turn up the sound volume of an audio device, and (b) indicates an example of speech input guidance shown when a cursor is moved to an entry for searching by a telephone number in a destination search on a navigation device.
Figure 11B:
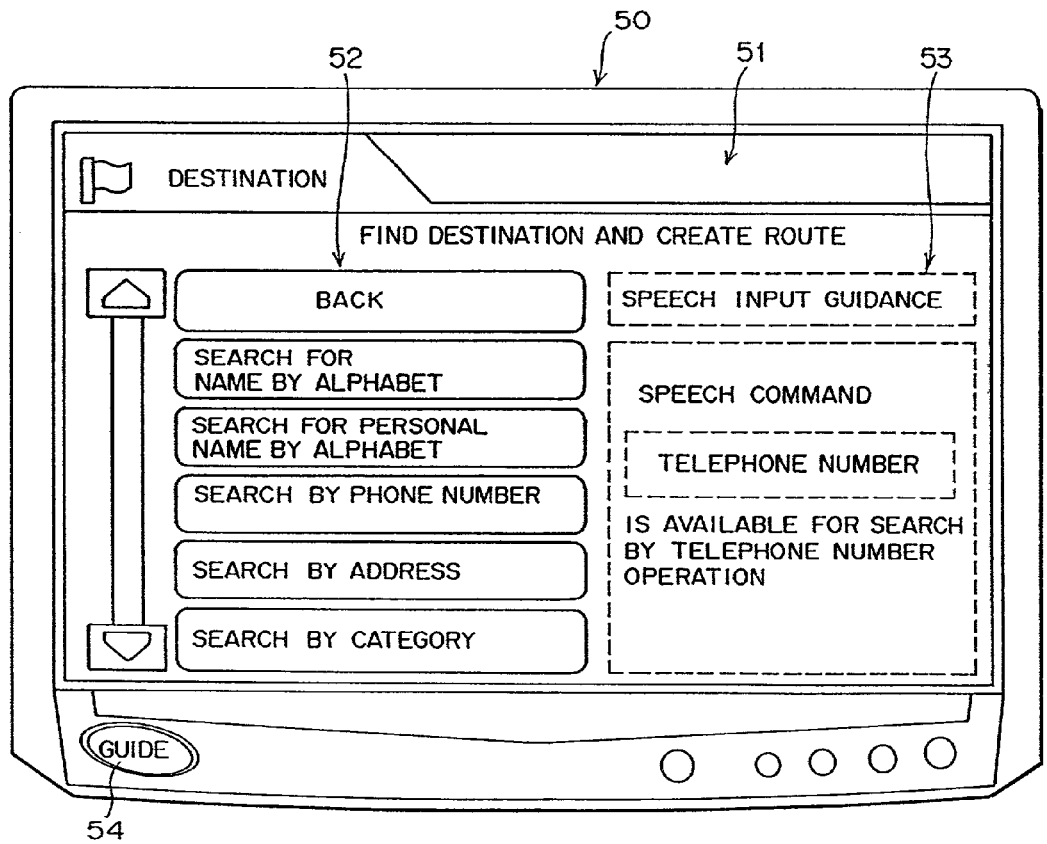

As the result of processing described above, when a user operates an MD head unit 41 as an audio device as shown in FIG. 11(a), for example, and the user presses a volume switch 42 with the finger 43 toward a direction for turning up the volume, a resultant signal is sent to the switch operation detecting unit 4 in the speech input guidance device in FIG. 1, and if the processing described above satisfies various conditions, the speaker provides an announcement, "Speech command 'Up volume' is available for turning up volume operation", and a screen display similar to the announcement appears on a display 44 which usually show different types of decorative displays and other information as shown in FIG. 11 A first display 45 indicates that speech input guidance is currently shown in the embodiment shown in FIG. 11(a), a second display 46 shows the content of an operation instruction currently conducted by a user, and a third display 47 emphasizes a command for a speech input for a user to view easily. A guidance switch 48 is provided on the audio device as a switch corresponding to the speech input guidance starting switch 8 in FIG. 1, and an arrangement with many additional audio switches is shown as an example. Alternative different forms can realize these display and arrangement of the switches, and rotating a knob of a rotary encoder can turn up/down the volume, for example, and the up/down can be detected by the rotation direction.

Figure 4:
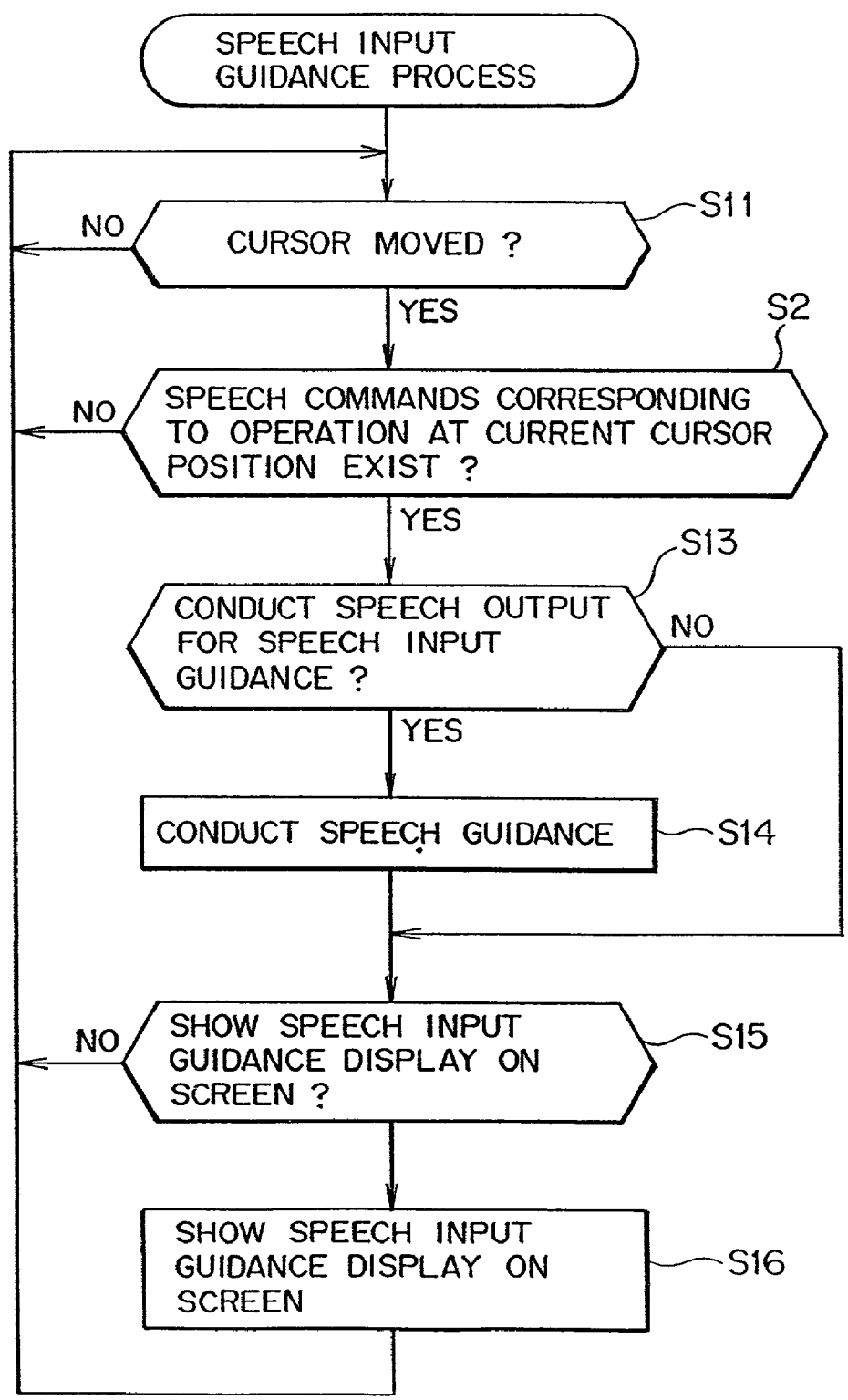
FIG. 4 is a basic operational flowchart of an embodiment of the present invention where speech input guidance is conducted as a result of the movement of a cursor.

FIG. 3 shows an operation flow of an embodiment where the switch operation detecting unit 4 detects operations when a user operates the switch 1, the rotary encoder 2, and the touch panel 3 shown in FIG. 1, and FIG. 4 shows an operation flow for speech input guidance conducted when the cursor operation detecting unit 6 detects a cursor operation of changing a color sequentially or brightly flashing as the result of cursor indication with the remote controller shown on the display 5 in FIG. 1.

An example shown in FIG. 4 first determines whether a cursor is moved or not (Step S11). The cursor operation detecting unit 6 in FIG. 1 detects it as described above. The procedure waits until the cursor moves while repeating the operation when a movement of the cursor is not detected. When the determination is made in Step S11, though it is possible to provide speech input guidance corresponding to the cursor when the cursor is simply moved, if a device is set to show a next screen after a confirmation operation at a cursor position, it is possible to provide speech input guidance during the confirmation operation.

If Step S11 determines that the cursor has moved, it is determined whether a speech command corresponding to an operation at the current cursor position exists (Step 12). It is determined such that the data searching/recording unit 20 searches for data in the speech input guidance data accumulating unit 21 to determine whether data for speech input guidance corresponding to the function of the switch exists, as in the embodiment in FIG. 3.

If it is determined that there is no corresponding speech command, the procedure returns to Step S11, and waits to detect a next cursor movement. If it is determined that there is a corresponding speech command, a process is conducted sequentially following an operation flow similar to that in the embodiment shown in FIG. 3 such that it is determined whether a speech output for the speech input guidance is to be provided or not (Step 13), the speech guidance is to be conducted (Step 14), it is determined whether a speech input guidance display is shown or not on the screen (Step 15), and the speech input guidance is shown on the screen (Step 16). These processes are similar to those in FIG. 3, and a description is omitted here.

As the result of the processes described above, when a user sets a destination on a navigation device, and wants to select a specific search method from different types of search methods, a screen 51 appears as shown in FIG. 11 (b). This drawing shows a search method list display 52 for listing different types of search methods selectable on this device, and shows a state where a user moves a cursor to the item "Search by phone number" to set a destination through a telephone number from the listed different types of search methods, and an information display 53, which is placed next to the search method list display 52 and is conventionally used to show reference information for the search operation, shows that this section is indicating "Speech input guidance" as well as showing "Speech command 'Telephone number' is available for search by telephone number operation".

This helps a user understand that the user can utter, "Telephone number", to enter a telephone number for the search when the user searches for a destination on the navigation device. A "GUIDE" switch 54 is provided at a lower left corner on a display 50 of the navigation device of the embodiment shown in the drawing, and is an example for providing a function corresponding to the speech input guidance start switch 8 in FIG. 1. This display arrangement can be embodied in alternative forms.

Figure 5:
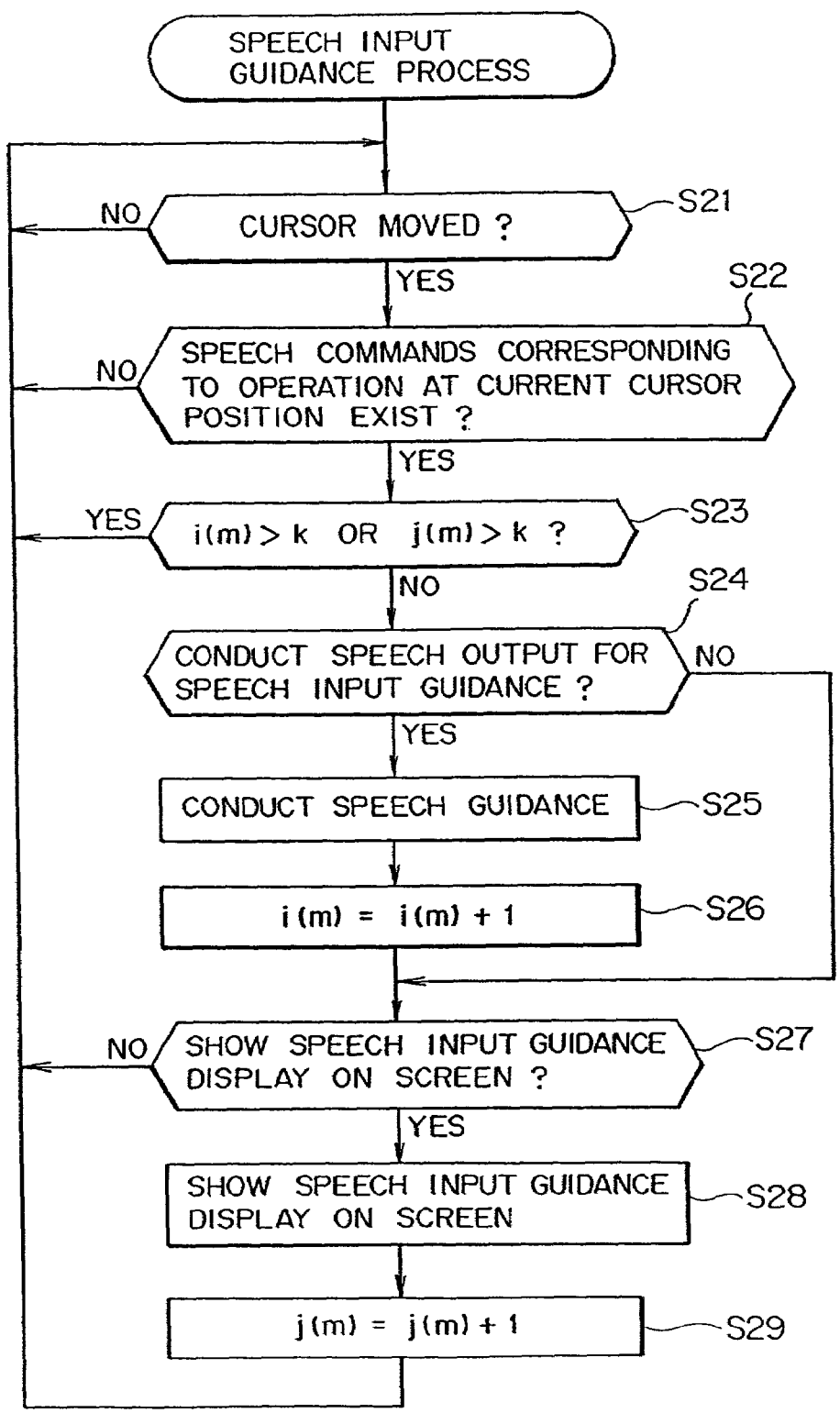
FIG. 5 is an operational flowchart of an embodiment of the present invention which changes the form of guidance according to an output count of guidance by speech and guidance with a screen display for a speech input.

FIG. 5 shows an operation flow of an alternative embodiment of the present invention. This drawing shows an example where the same speech input guidance is not repeated any more after the same speech input guidance has been repeated for more than a predetermined number of times for speech input guidance which is provided after detecting a cursor movement. Step S21, which determines whether a cursor is moved, and Step S22, which determines whether a speech command corresponding to an operation at the current cursor position exists, in the drawing are the same as those shown in FIG. 4, and a description of them is omitted here.

If it is determined that a command corresponding to the current cursor position exits in Step S22, the count i(m) for speech guidance, and the count j(m) for guidance display on the screen are read out from the speech input guidance data shown in FIG. 2, and it is determined whether the individual values exceed a predetermined value (k) or not (Step S23). These data counts are updated such that the speech input guidance execution detecting unit 22 shown in FIG. 1 detects each time output guidance is provided, and the data searching/recording unit 20 adds one to, updates, and stores these data in the speech input guidance data accumulating unit 21 through the speech input guidance central controlling unit 7.

If the conditions in Steps S23 are not met, namely the number of speech input guidance by speech does not exceed the predetermined number, or the guidance on the screen does not exceed the predetermined number, it is determined whether or not a speech output for the speech input guidance is to be provided (Step S24), and if it is determined to provide the speech output, the speech guidance is executed (Step S25). These processes are the same as those in FIG. 3 and FIG. 4, and a description of them is omitted here. If either the count of the repeated same speech input guidance by speech i(m), or the count of guidance with a screen display j(m) exceeds the predetermined number (k), five for example, in the determination in Step S23, the procedure returns to Step S21 again to wait for a new cursor movement.

Though this embodiment is an example where the procedure returns to Step S21 in the determination, if it is determined that either one of them is more than the predetermined count, for example 10, it is possible to determine that a user does not want the speech input even if the user has not turned off the speech input guidance start switch, and to stop speech input guidance processing thereafter.

An execution of the speech guidance relating to the speech input is detected, and one is added to the speech guidance count i(m) shown in FIG. 2 (Step S26). This process is conducted such that the speech input guidance execution detecting unit 22 in FIG. 1 detects an execution of the speech input guidance, and the data searching/recording unit 20 adds one to the data in FIG. 2 in the speech input guidance data accumulating unit 21 as described above. Though after this process the procedure proceeds to a next step S27, the procedure also proceeds to Step S27 when it is determined not to conduct the speech output for speech input guidance in Step S24.

It is determined whether a display for the speech input guidance is shown on the screen in Step S27, and the procedure returns to Step S21 to repeat the action described above if it is determined not to display. If it is determined to display the guidance, the speech input guidance is shown on the screen (Step S28). The processes in these steps are the same as those in FIG. 3 and FIG. 4. An execution of a display of the speech input guidance on the screen is detected as in Step S26, and one is added to the guidance display count j(m) shown in FIG. 2 (Step S29). This process is also conducted by a detection by the speech input guidance execution detecting unit 22, or an update of the data by the data searching/recording unit 20 as described above. The procedure returns to Step S21, and detects a new movement of the cursor.

Figure 6:
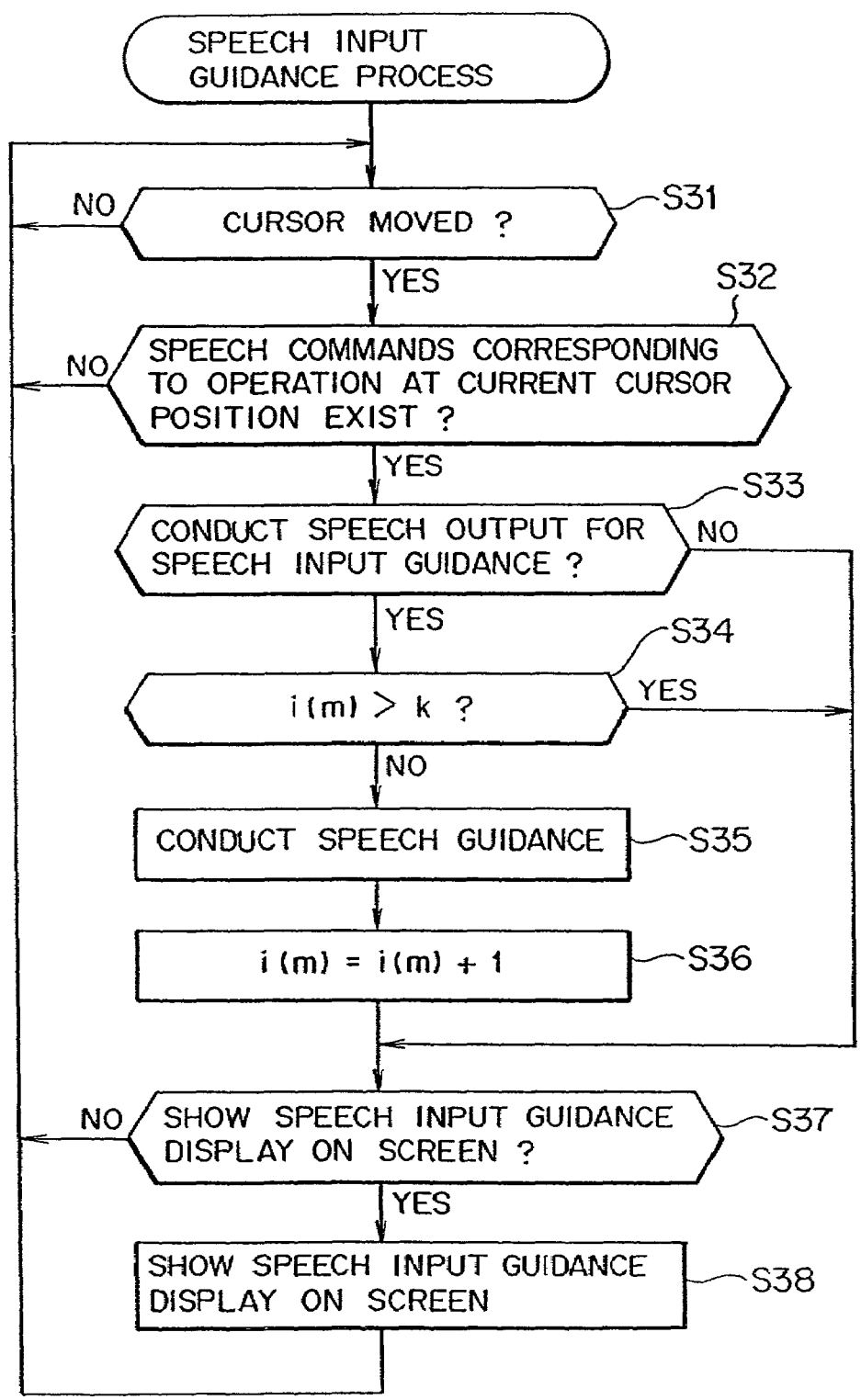
FIG. 6 is an operational flowchart of an embodiment of the present invention which changes the form of guidance according to an output count of guidance by speech for a speech input.

While the embodiment described above shows an example where whether the count i(m) for providing the same speech input guidance by speech or count j (m) for providing guidance as a screen display exceeds the predetermined count (k) determines whether or not to provide the different types of guidance thereafter in the determination in Step S23, it is possible to determine whether only the count i(m) for providing the same speech input guidance by speech exceeds the predetermined count (k), and not to provide the guidance by speech only if the predetermined number is exceeded, and FIG. 6 shows an operation flow for that.

Points different from the operation flow in FIG. 4 include Step S33 where it is determined whether the count i(m) of outputs of the same speech input guidance by speech exceeds the predetermined count (k) after it is determined whether the speech output for speech input guidance is conducted. The speech guidance is not provided if the predetermined count is exceeded, and the speech guidance is provided, and one is added to the recorded data if it is not exceeded, and the rest of the procedure is the same in the operation flow in FIG. 6.

It is possible to partially change the process shown in FIG. 6, to provide speech guidance without considering a count of occurrences of the same speech guidance, to determine whether the count j(m) of providing the same speech input guidance exceeds the predetermined count (k) only for a guidance display on the screen, and not to conduct the screen display if it is exceeded. In this case, it is possible to always conduct the speech guidance, which is a major guidance means for the speech input guidance, and not to repeat auxiliary guidance.

Figure 7:
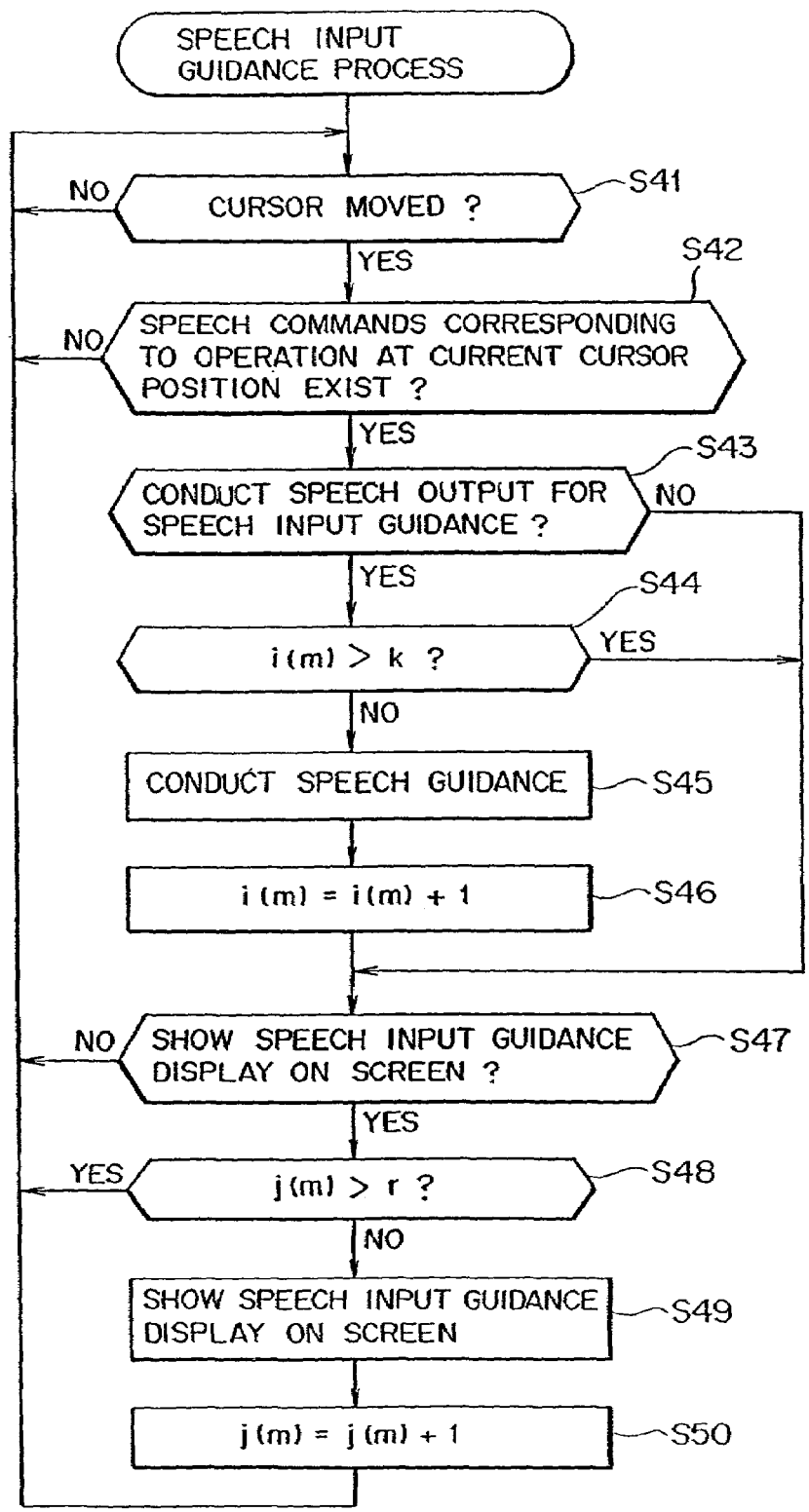
FIG. 7 is an operational flowchart of an alternative embodiment of the present invention which changes the form of guidance according to an output count of guidance by speech and guidance with a screen display for a speech input.

As shown in FIG. 7, it is possible to determine whether speech input guidance is shown on the screen in addition to the process shown in FIG. 6 (Step S47), to determine whether the count for showing the same guidance screen has exceeded a predetermined number (r), and not to show the guidance display on the screen if the count is exceeded. In this case, the predetermined number (r) is set to a value different from the count (k), which is a reference value for determining whether the repetition of guidance by speech exceeds the predetermined number. It allows different types of detailed setting such as an example where the same guidance by speech is not repeated more than five times, and the same guidance by a screen display is not repeated more than ten times.

Because the data searching/recording unit 20 receives a signal from the speech input guidance execution detecting unit 22 in FIG. 1, and updates data accumulated in the speech input guidance data accumulating unit 21 shown in FIG. 2, using the speech input execution count h(m) can allow a process for not conducting speech input guidance for a phrase if a user has executed the command by speech more than a predetermined count. Data shown in FIG. 2, which is base data for the process, are updated following the operation flow shown in FIG. 8.

Figure 8:
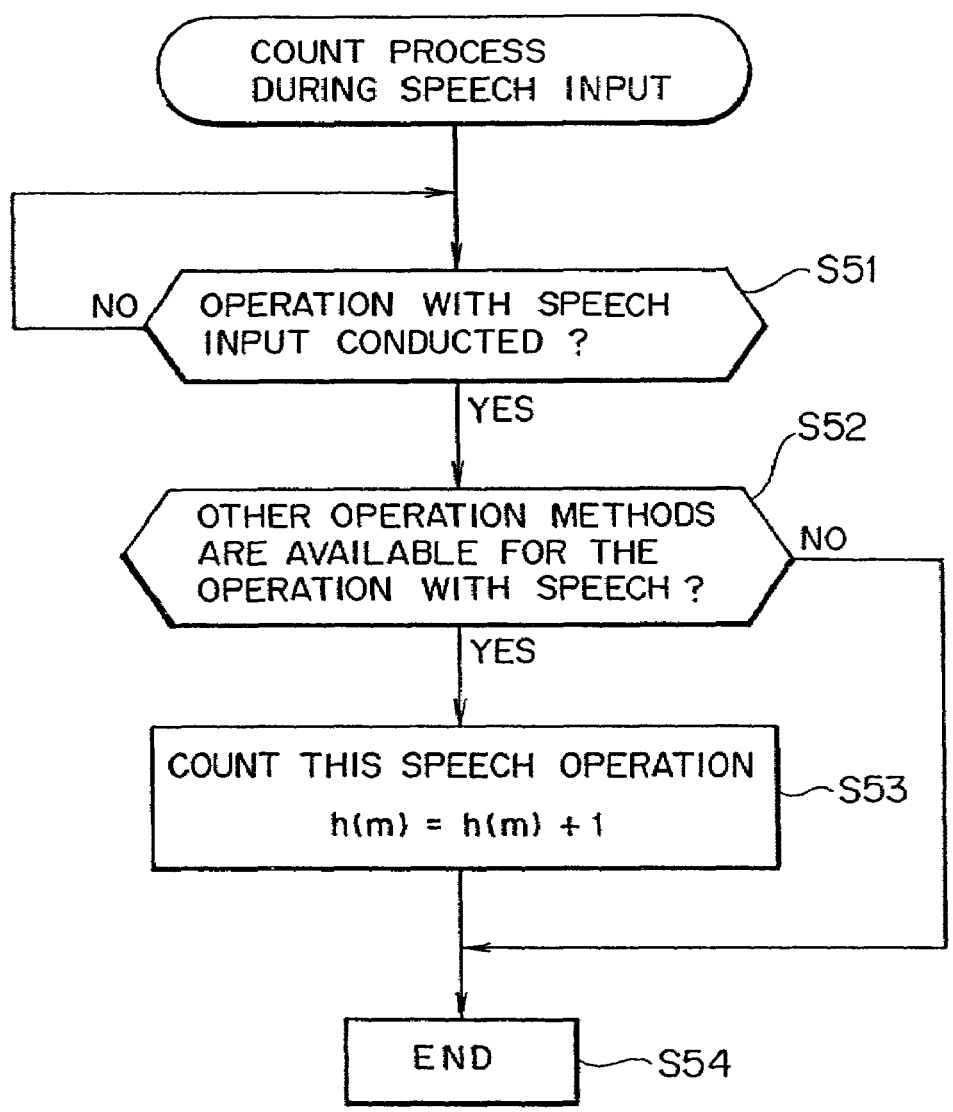
FIG. 8 is an operational flowchart of an embodiment of the present invention for a process which counts a number of actual speech inputs.

For a count process during a speech input shown in FIG. 8, first, it is determined whether an operation by means of a speech input is conducted (Step S51); the step is repeated until the operation is conducted if the operation has not been conducted; and it is determined whether or not there are other operation methods for the operation by speech if the operation is conducted (Step S52). For example, a list of operations which are activated only by a speech input on the currently used device is separately provided in the speech input guidance data shown in FIG. 2, and this list is referred to for this determination.

As a result, if it is determined that the operation for which the speech input has been conducted can be operated by other means such as a switch or a cursor, the count for this operation by speech is incremented by one (Step S53). This count is conducted by the speech input guidance central controlling unit 7 which receives a signal from the speech input execution detecting unit 17, and the data searching/recording unit 20 adds one to the speech input execution count h(m) corresponding to the entered speech command in speech input guidance data accumulating unit 21, and replaces the calculated value with it.

As described above, because it is considered that a count of inputs by speech while there is another operation means indicates that a user is familiar with executing this operation by speech input, the number of speech inputs is counted, accumulated, and stored. Data accumulated in this way can be used to conduct a process according to an operation flow shown in FIG. 9, for example.

Figure 9:
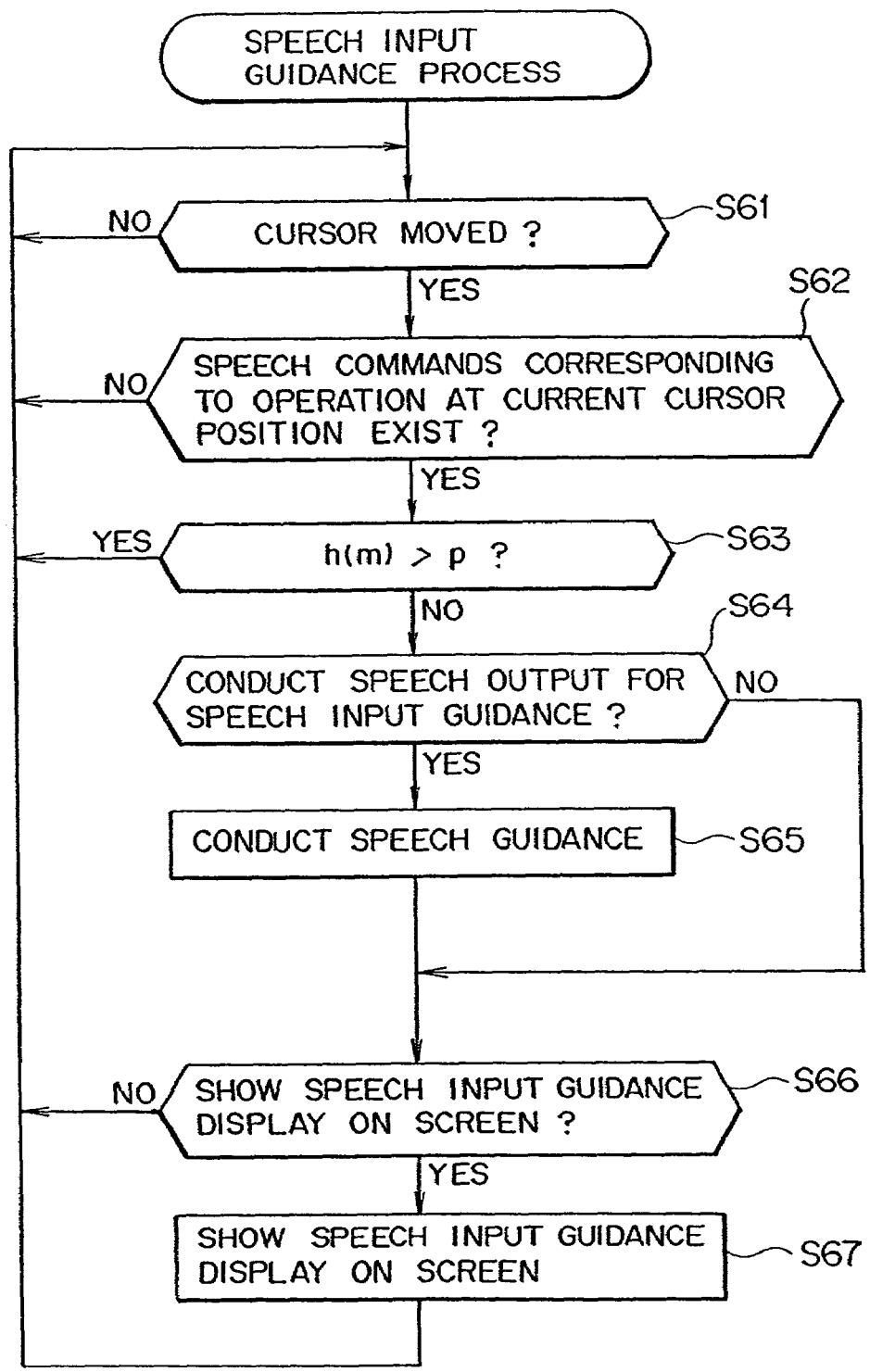
FIG. 9 is an operational flowchart of an embodiment of the present invention which changes a form of speech input guidance according to a count of actual speech inputs.

The operation flow in FIG. 9 shows an example where only Step S63 is added to the embodiment in FIG. 4 to clarify its feature. Namely, Step S61 and Step S62 in FIG. 9 are similar to Step S11 and Step S12 in FIG. 4, and h(m)>p is used to determine whether an operation indicated by moving the cursor has received an operation instruction with a speech input more than a predetermined count (p), which is three for example, in the operation flow in FIG. 9 (Step S66).

If it is determined that the number of occurrences of a speech input exceeds the predetermined count, it is determined that speech input guidance for the operation is not necessary, and the procedure returns to Step S61 to wait for the next cursor movement. If it is determined that the number of speech input occurrences does not exceed the predetermined count such as three, a speech guidance process and guidance with a screen display similar to those shown in FIG. 4 are conducted. Conducting these processes can effect speech input guidance while considering the experience that a user has conducted specific operations by speech input.

Figure 10:
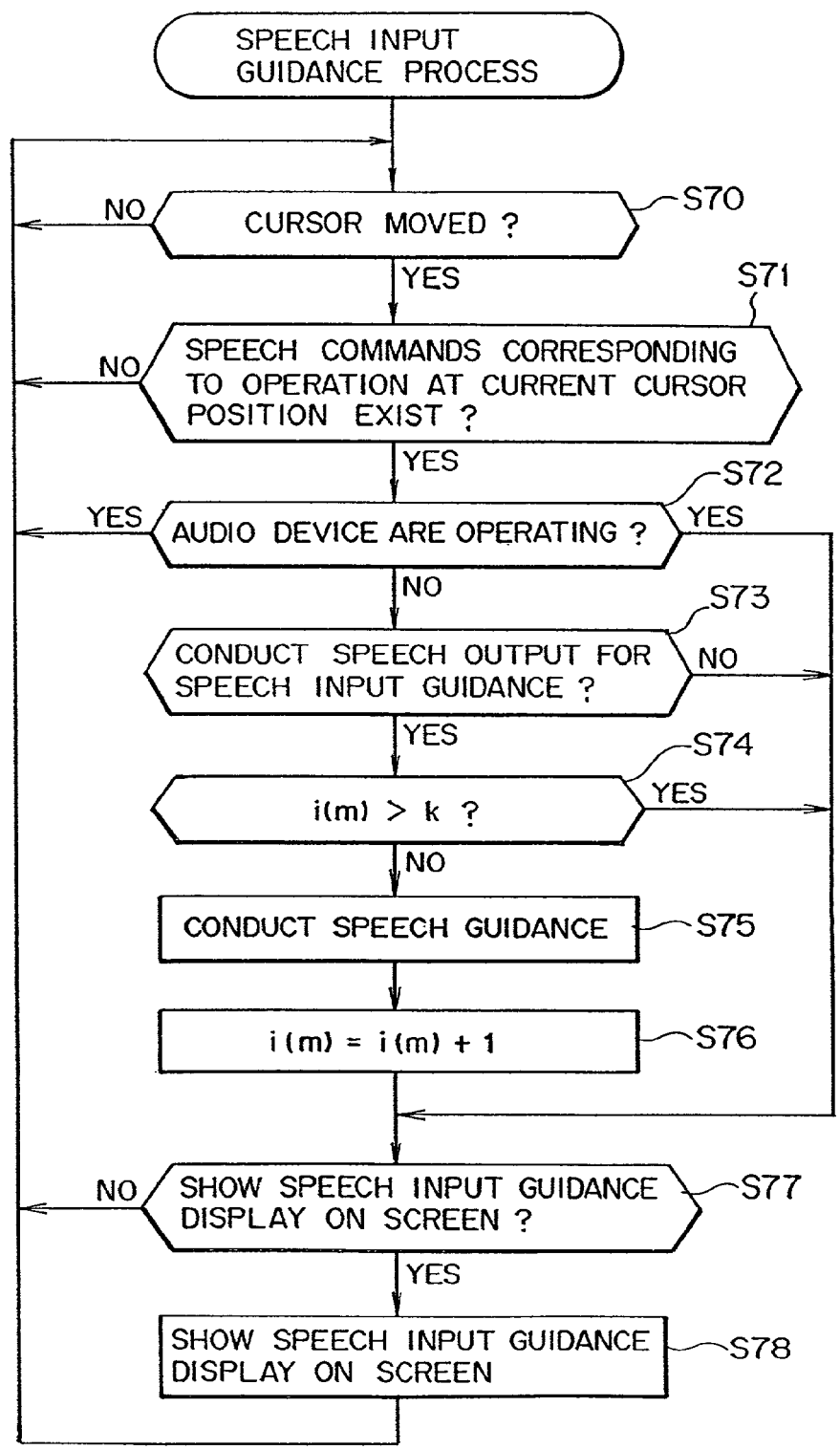
FIG. 10 is an operational flowchart of an embodiment of the present invention which changes a form of speech input guidance according to the operation of an audio device.

A signal from an audio device action detecting unit 13 for receiving operation signals of different types of audio devices, and a signal from a route guidance action detecting unit 14 for detecting operations relating to route guidance among different types of operations of the navigation device 11 as shown in FIG. 1 are used as a condition for conducting speech input guidance in the present invention, and a speech input guidance device for conducting detailed control which does not interrupt a user is realized. FIG. 10 shows that embodiment.

FIG. 10 shows an embodiment which differs from the embodiment shown in FIG. 6 in the addition of Step S73 to clarify the feature, and it is determined whether an audio device is operating or not after Step S71, which corresponds to Step S32 in FIG. 6. As a result, if it is determined that the audio device is operating, only guidance with a screen display is conducted so as not to disturb the user listening to the audio device. If the audio device is not operating, an operation similar to the operation flow shown in FIG. 6 will be conducted thereafter.

While the embodiment described above is an example where a user is using an audio device to listen to music as one example for not disturbing the user using different types of devices, it is possible that both guidance by speech and guidance with a screen display are conducted while a user is listening to a music source on a general audio device such as a cassette tape, a CD, an MD, and a DVD, and the audio device action detecting unit 13 in FIG. 1 detects an operation of the AM/FM radio 10, the guidance by speech is stopped, and only the guidance with a screen display is conducted while the user is listening to the AM/FM radio where the user is likely listening to traffic information or news.

Further, in the example above, when the guidance speech is stopped, the speech input availability confirmation sound output unit 27 in FIG. 1 may generate a confirmation sound such as a beep or a pip sound through the speaker 31 or other sound generating means such as a buzzer to indicate that there exists sound input means for a switch currently operated. In this state, the guidance on the screen may be used simultaneously, or the display on the screen may be stopped.

Further, when the route guidance action detecting unit 14 conducts an important guidance by speech or with the screen relating to a vehicle traveling route such as a left/right turn guidance at an intersection, guidance on exits at an interchange, guidance on traffic accident information obtained from VICS, and guidance on occurrences of traffic congestion on the navigation device 11 as shown in FIG. 1, it is possible to set that the guidance by speech is stopped, and the display on the screen is stopped as well if necessary. In this state, a confirmation sound such as a beep or a pip sound may be generated through the speaker 31 or a buzzer provided separately to indicate that a sound input is available for the switch operation conducted currently as describe above.

Though the operation flows in FIG. 5 and subsequent Figures describe only examples where the cursor is moved, they also can be applied to cases where a switch operation on a device is detected for an operation as shown in FIG. 3. As in detecting a cursor movement, guidance may start when a specific selection display is indicated with the cursor as described above, or the guidance may start only when a selection input operation for specifying the selection display is conducted. For the switch, a touch sensor for detecting a touch of a finger may be provided, and guidance for availability of a speech input is conducted immediately after a finger touches the switch before an operation of pressing the switch.

When a method for a speech input operation changes, or a range of a speech input operation extends due to an enhanced version of a model, for example, an internal program and a memory in the data accumulation unit can be updated to make the speech input guidance of the present invention ready for it. When a feature for freely installing/uninstalling a memory is available on the device, using a personal computer to access a homepage of a maker of the device through the Internet, and to download a supplied program to the memory, and installing the memory to the device can easily update the program. If the device includes a feature for connecting with the Internet, the program may be updated directly. While the embodiment above shows an example provided with both the guidance speech output unit for conducting speech input guidance by speech, and a guidance screen display output unit for conducting a guidance display on a screen, either one of them can embody the present invention.

While the embodiment above describes an example of a device which provides guidance that an operation can be conducted by speech input, or which commands are available for an operation when a user operates with other means while the operation with a speech input is available, the present invention can conduct speech input guidance with various means as well.

Namely, when a device operation input is entered through the microphone 15, the speech input execution detecting unit 17 detects a signal received by the speech input unit 16, and the speech input guidance central controlling unit 7 determines that a user has uttered a phrase, for example, "Sound volume", which only indicates an operation object, the data searching/recording unit 20 searches for data in the speech input guidance data accumulating unit 21 for accumulating operation objects and phrases for operating them as lists, and the results are shown as a list on the display 5 from the image output unit 28 through the guidance action start output unit 23 and the guidance output selecting unit 24, and are provided from the speaker 31 through the guidance speech output unit 26 in functional block diagram shown in FIG. 1 as the embodiment described above.

In addition to the case described above where a speech input operates an operation object, when how to operate a category of operation objects, namely one feature of the operation object, is instructed with a speech such as selecting a display type for VICS information as one form of a traffic guidance, for example, accumulating data for the guidance in the speech input guidance data accumulating unit can handle it with the functional blocks shown in FIG. 1. One feature in an operation object such as selecting the display type for VICS information is also abbreviated as an operation object for the sake of description.

Figure 12:
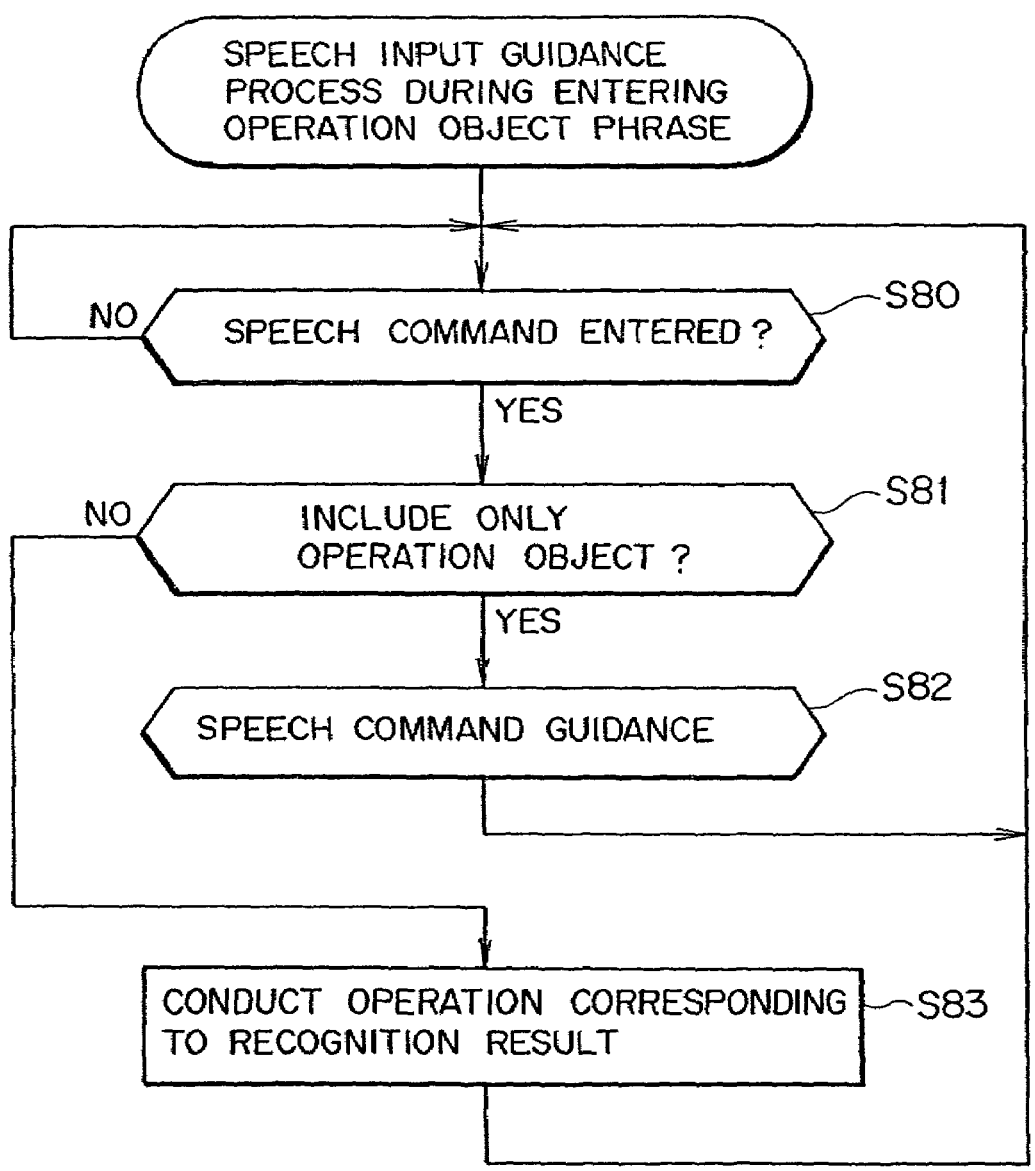
FIG. 12 is an operational flowchart of the operation of an alternative embodiment of the present invention.

This feature for speech input guidance can be processed following an operation flow shown in FIG. 12. The following section describes it while referring to examples of speech input guidance lists shown in FIG. 13 and FIG. 14. For a speech input guidance process during a speech input for an operation, it is first determined whether there exists a speech command input during speech input (Step S80). If it is determined that there is no speech command which has been registered in advance in a phrase uttered by a user into a microphone, the procedure returns and repeats this step.

In Step S80, if it is determined that a phrase which a user uttered into a microphone includes a speech command which has been registered in advance, namely it is determined that a speech command is entered, it is determined whether the speech command is a command which includes only an operation object (Step S81). As a result of the determination, if the command is a command including only an operation object such as "Sound volume", guidance for speech commands relating to the operation object is conducted (Step S82). If it is determined that the command does not include only an operation object, namely it includes the operation to be applied to the operation object as well in Step S81, an action corresponding to a recognized result of the speech command is conducted (Step S83), and the procedure returns to the first step S80.

For the guidance described above, with respect to commands relating to the sound volume described above, data shown in the right section in FIG. 13, for example, are accumulated in the speech input guidance data accumulating unit 21 in FIG. 1. When phrases such as "Up sound volume", "Turn up sound volume", "Up volume", "Turn up volume", "Down sound volume", "Turn down sound volume", "Down volume", and "Turn down volume" are set as commands relating to adjusting the sound volume available by speech input, if a user utters a phrase indicating only an operation object, "Sound volume", the phrase "Volume" is registered for the speech input guidance while it is associated with "Sound volume" to guide a phrase other than that phrase which can operate the same operation object, namely a paraphrasing phrase. Also, individual phrases "Up", "Turn up", "Down", and "Turn down" are registered as phrases for operation contents which are used for a command "Sound volume" indicating an operation object.

In the same way, if a user utters a phrase indicating an operation object, "Volume", the phrase, "Sound volume", is registered for the speech input guidance while it is associated with "Volume" to guide a phrase other than that phrase which can operate the same operation object, namely a paraphrasing phrase. Also, individual phrases "Up", "Turn up", "Down", and "Turn down" are registered as phrases for operation contents which are used for a command "Volume" indicating an operation object as they are registered for "Sound volume".

Figure 15A:
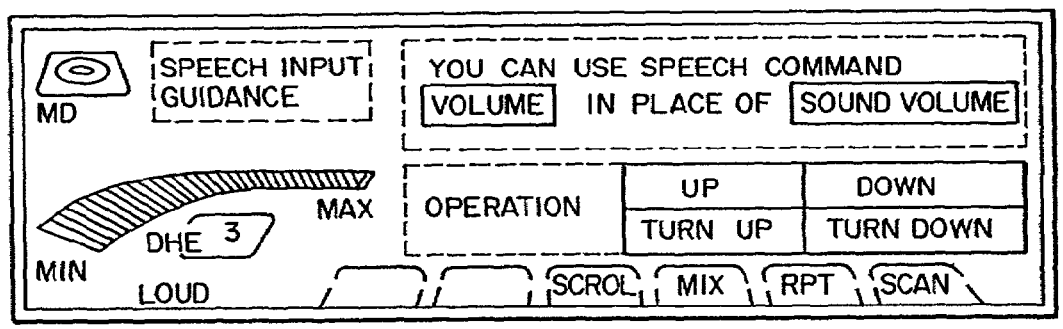
FIG. 15 illustrates examples of speech input guidance actually shown in an embodiment of the present invention, where (a) indicates an example for showing speech input executing commands for paraphrasing, and speech input executing commands for an operation content corresponding to a speech input executing command for an operation object, and (b) indicates an example for showing commands relating to the speech input executing command.

As a result of the registration, when a user utters, "Sound volume", which indicates only an operation object, to the microphone 15 in FIG. 1, the speech input guidance central controlling unit 7 receives the phrase through the speech input unit 16 and the speech input execution detecting unit 17, instructs the data searching/recording unit 20 to search for data in the speech input guidance data accumulating unit 21 which stores data such as "Speech input guidance accumulating data" in FIG. 13, and displays the result as shown in FIG. 15(a), for example. This display provides the guidance, "Sound volume" can be conducted by a speech command "Volume" as well, and shows that there are phrases such as "Up", "Turn Up", "Down", and "Turn down" as commands for operations combined with the operation object.

When the user sees them, the user easily understands various commands relating to "Sound volume". The same content is guided by speech as well, and the guidance output selecting unit 24 in FIG. 1 conducts a selection operation for various guidance outputs manually or automatically according to the operation state of the audio as described above.

Recently, it has been proposed as one feature of a navigation device to use a cellular phone to connect with the Internet, and obtain different types of information, and it has also been proposed to send/receive electronic mail as a part of it. When an operation instruction by speech is given for electronic mail, commands of integrated phrases comprising an operation object and how to operate it such as "Transmit mail", "Send mail", "Receive mail", and "Get mail" are registered as shown in a right section in FIG. 14(a), and phrases such as "Transmit", "Send", "Receive", "Get", "Read", "Store", and "Save" are registered as well to show what phrases are available for the operation object when a user utters only a phrase "mail", which only indicates an operation object.

Commands relating to VICS comprising a phrase for an operation object, and a phrase for how to operate it such as "VICS character information" and "VICS graphic information" are stored as shown in FIG. 14(b), and phrases such as "Character information" and "Graphic information" are stored as well while they are associated to show what phrases can be combined with an operation object for a operation when a user utters "VICS", which indicates only an operation object.

Figure 16A:
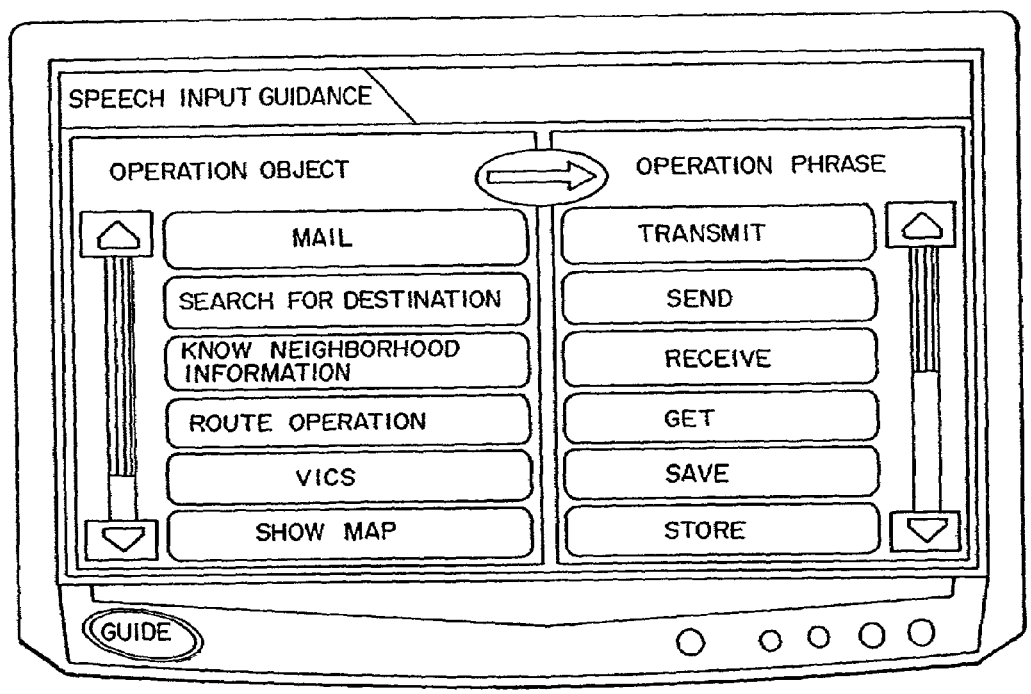
FIG. 16 illustrates examples of speech input guidance actually shown in an embodiment of the present invention, where (a) indicates an example for showing speech input commands for an operation content corresponding to a speech input command for an operation object, and (b) indicates an example for showing speech input commands for an operable operation object corresponding to the speech input command for an operation object.

As a result of the registration, when a user utters, "mail", which indicates only an operation object, to the microphone 15 in FIG. 1, data are searched in the speech input guidance data accumulating unit 21 which stores data as shown in FIG. 14(b), for example, and the result is displayed as shown in FIG. 16(a) as described above. A speech input list enumerates a list of "Operation object" in a left column in the example shown in the drawing, thereby showing the operation objects for which a user can use a speech input on this device. When it is recognized that a user utters, "Mail" as described above, the item "Mail" is highlighted in the list, and "Operation phrases" are enumerated on the right side as phrases for speech operations available for the operation object.

When the user sees them, the user can understand what operations by speech are available for "Mail", and the phrases available for the operations. In this state, guidance with image and guidance by speech for the same content are conducted as described above, and a selection from these guidances is made according to an instruction from a user, or automatically as set in advance.

The user may place a cursor of a remote controller on one of the commands, and press an execution button, or touch a certain command display when the screen is set up as a touch panel to execute the command feature on this screen display.

Figure 16B:
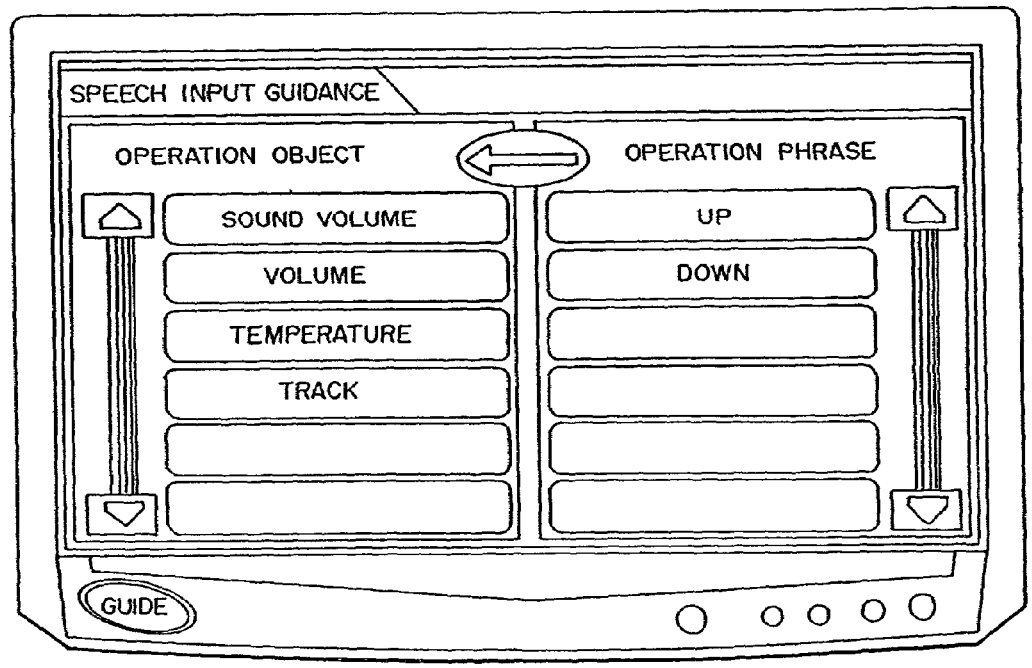

As shown in FIG. 16(b), for example, when a user enters a speech input including only a phrase indicating an operation such as "Up", which is the inverse of the case before, and the same phrase can operate multiple operation objects, the operation objects may be provided. It is indicated that the phrase for an operation, "Up", is combined with "Sound volume", or "Volume" for turning up a sound volume on an audio device; is used for increasing a "Temperature" on an air conditioner; and is used to select a track as a song selection action for an audio device in the example shown in FIG. 16(b), and this feature serves as a reverse dictionary of the guidance feature in FIG. 16(a).

FIG. 16(a) shows a screen displayed when a user enters an operation object by speech, and an arrow directing from "Operation object" to "Operation" indicates that speech commands for operations corresponding to operation objects are shown in the example shown in FIG. 16. FIG. 16(b) shows a screen displayed when a user enters an operation by speech, and an arrow directing from "Operation" to "Operation object" shows a user what operation objects an "Operation phrase" as a command for an operation is used to operate. The example shown in FIG. 16(b) also indicates that there exists a phrase, "Down", which has an extremely strong relationship with the phrase, "Up", and this phrase can be used for the same operation objects.

While the embodiment above is described while using an isolated word speech recognition system as an example, which is widely used now, and recognizes individual words independently, it may be applied to a connected speech recognition system which can relatively flexibly adapt to unnecessary words, and conjugations of verbs. Because this system has a limitation in the degree of application to combinations between operation objects and operations, a feature for guiding to commands for operations relating to operation objects is necessary, and it is desirable to conduct speech input guidance similar to the foregoing for the feature.

It is possible to conduct speech input guidance on a sound volume when a phrase registered in advance for requesting an output of speech guidance on a specific operation object such as "Sound volume guidance" or "Sound volume help" is uttered. Because it is required to register many speech commands in advance for conducting speech input guidance with phrases in this way, the previous embodiment which is activated by only phrases for operation objects is more preferable for a simple operation.

When speech input guidance is conducted in the embodiment described above, a user easily remembers a correspondence between operations and speech commands, the user knows only speech commands for an operation object, the user uses the speech input guidance to know commands for an operation which the user does not know, an operation with a speech command becomes easy, and the use easily knows what operation objects are operated with a phrase when the user knows a command phrase for an operation, and can easily remember them.

Further, when speech input guidance is conducted as described above, because a user can easily remember phrases for a specific speech input, it is not necessary to register phrases for paraphrasing more than necessary as accumulated data for speech recognition. When various phrases for paraphrasing are defined, and they are registered in accumulated data for speech recognition, it is not necessary for a speech recognition device to select and recognize phrases corresponding to an entered specific phrase from many data, and the error recognition rate during speech recognition decreases.

Also, because speech input guidance can be conducted while the guidance is classified by operation object as shown in FIG. 16(a), for example, the speech input guidance can be easy to understand for a user. When the model of a vehicle onboard device is changed, or the version of software for operating the device is updated, and commands for speech guidance are changed, partially changing software for the speech guidance can easily adapt to it, and a feature for guiding to the changes may be added. The form of speech input guidance may be switched such that guidance by speech and guidance with a screen are conducted simultaneously, either of them is conducted independently, or they are conducted manually or automatically according to predetermined conditions as in the embodiments described above.

While when a phrase for an operation object such as "Sound volume" is entered, speech guidance on input commands for how the object is operated is conducted in the embodiment above, the display may be sorted such that commands used less frequently or used less recently are prioritized for display, for example, according to a record for how a user has used the speech input device.

In this case, because a count h(n) for speech input executions is updated in the speech input guidance data shown in FIG. 2 when the guidance output selecting unit 24 in FIG. 1 provides an image output or a speech output, the speech input guidance execution detecting unit 22 uses this datum to detect a record of speech inputs of the user, and the commands for speech input guidance are sorted based on this record datum. A part for storing the latest date and time of speech input is further added to the counts shown in FIG. 2, and these data are used to sort the data in different ways such as chronological order of the speech input data and time.

Figure 17:
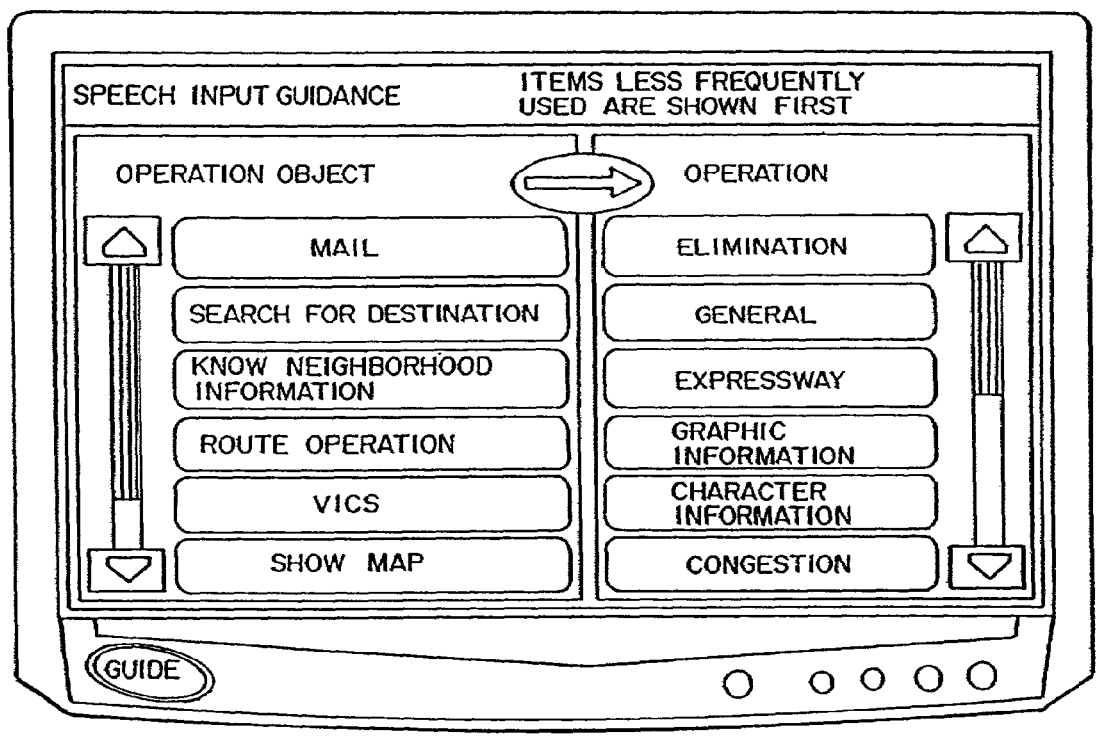
FIG. 17 illustrates an example of speech input guidance actually shown in an embodiment of the present invention, showing speech input commands for an operation content corresponding to a speech input command for an operation object, while they are inversely prioritized by the frequency of usage.

Sorting data as described above presents a display as shown in FIG. 17, for example. The display shown in FIG. 17 presents an example of guidance for speech input commands relating to a display of VICS information as shown in FIG. 14(b). When a user utters, "VICS", the speech recognition device searches for data in the speech input guidance data accumulating unit 21 for recording data as shown in FIG. 14(b), sorts many commands existing as operations in order of frequency of usage, and shows them as in FIG. 17.

In this example, "Elimination", which is a command for removing arrows showing congestion displayed on the map screen of the navigation device, is shown at the top as the least used command, "General" for showing VICS information only on general roads, "Expressway", "Graphic information", "Character information", and "Congestion" are shown in this order. If there are other commands, scrolling the screen will display them. Commands with a high usage frequency may be shown in a color different from others, or shown smaller and less remarkable in addition to decreasing display order. As a result, it is possible to know that a user frequently uses the shown commands.

In the display above, commands which a user has used more than a predetermined count may be set to be hidden. While this setting is applied to a case where a display is based on a priority of usage frequency as described above, this setting may be applied to a case where the display is not based on the priority as a display example shown in FIG. 16. Omitting guidance for commands which a user has used more than a predetermined count decreases the number of display items of the speech input guidance as the execution record for speech input operation increases, and the speech input guidance device can be friendly to the user.

Figure 15B:
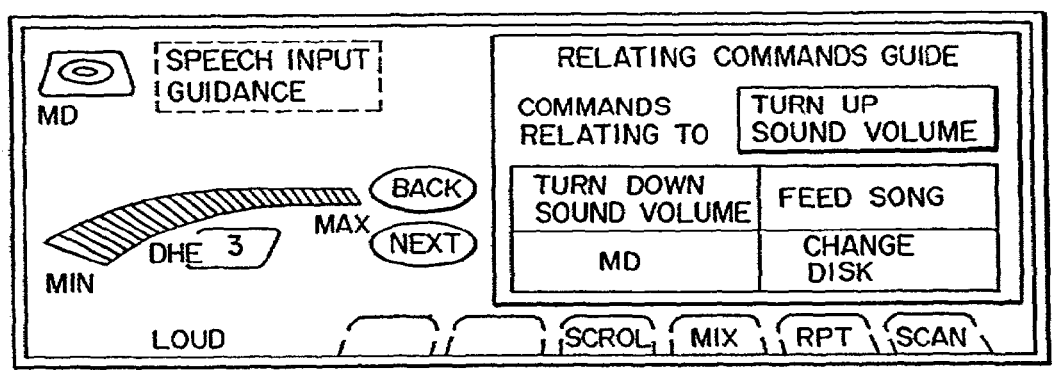

Because when a user uses only commands with a high usage frequency for input during speech input guidance in the embodiment above, as long as a user does not conduct a special operation or a speech input including only an operation object, speech input guidance may not be conducted, when the user enters a command, "Turn up sound volume", which the user uses frequently, the existence of various commands such as "Turn down sound volume", "Feed song", "MD", and "Disc change" as commands relating to it may be shown as a reference, as shown in FIG. 15(b). If there are many additional related commands, the operations "Next" and "Back" may be used for scrolling a display arbitrarily.

Because if this guidance is conducted by speech, it may annoy a user, it is preferable to conduct the guidance with a screen, and the guidance output selecting unit 24 in FIG. 1 may set this feature. In this state, using a remote controller to move a cursor on a displayed command, and to execute the command directly effects an operation on the device corresponding to the command.

While when a phrase including only an operation object such as "Sound volume" is entered, it is considered that a user requests guidance by speech, and a speech input guidance request of the user is detected in the embodiment above, pressing the "GUIDE" key shown in FIG. 11 may be considered as requesting speech input guidance, and speech input guidance for operations enumerated by operation object in FIG. 16(a) may be shown, for example. The speech input guidance as described above may be shown as well when a user utters a specific phrase such as "Speech guidance". The speech input guidance output request detecting unit for detecting a speech input guidance output request from a user and providing it detects various states such as a case where a phrase including only an operation object is entered as described above, a case where a user utters, "Sound volume guidance", as well as a case where a key operation is detected as described above and a case where "Speech guidance" is uttered.

Because a speech input guidance method relating to the present invention comprises the steps of detecting a device operation by a user, searching for a speech input executing command corresponding to the device operation from a speech input guidance data accumulating unit, and providing the user with the searched speech input guidance, when a user operates a device by a means other than speech while the device is provided with a speech input device, the user immediately knows that a speech input is available for the operation, and what phrases are available for the operation, the user can easily understand a speech input operation without a special operation, and the user can master the speech input operation faster.

Because a device provided with a speech input guidance device relating to the present invention for receiving operation instructions by speech for different types of features, when a user operates the device by a means other than speech, the user immediately knows that a speech input is available for the operation, and what phrases are available for the operation, the user can easily understand the speech input operation without a special operation, and mastering the speech input operation by a user can be accelerated.

Because an alternative speech input guidance device relating to the present invention is characterized in that the speech input guidance output unit is provided with at least one of a guidance speech output unit for guiding by speech, and a guidance screen display output unit for showing guidance on a screen, a user immediately knows through speech or a screen display that a speech input is available for an operation of a device conducted by the user, and what phrases are available for the operation, and mastering the speech input operation by a user can be accelerated easily.

Because an alternative speech input guidance device relating to the present invention is characterized in that the device operation detecting unit detects at least one of a switch operation, a rotary encoder operation, a touch panel operation, and a cursor operation, when a user operates any one of them, the user immediately knows that speech input is available for the operation, and what phrases are available for the operation, and mastering the speech input operation by a user can be accelerated.

Because an alternative speech input guidance device relating to the present invention further comprises a speech input guidance controlling unit for providing whether speech input guidance is to be conducted or not, and is characterized in that the speech input guidance is stopped when the speech input guidance controlling unit provides an output for stopping the speech input guidance, the output of speech input guidance can be stopped in various forms according to the determination conducted by the speech input guidance controlling unit, and fine-tuned guidance such as conducting speech input guidance without disturbing a user is possible.

Because an alternative speech input guidance device relating to the present invention is characterized in that the speech input guidance controlling unit stops the speech guidance when an action of a device for conducting a speech output including an audio device is detected, it is possible to set such that guidance by speech does not disturb a user who is listening to the audio device.

Because an alternative speech input guidance device relating to the present invention is characterized in that the speech input guidance controlling unit stops the speech guidance when the operation of a radio is detected, the guidance does not disturb a user who is obtaining important information such as traffic information or news.

Because an alternative speech input guidance device relating to the present invention is characterized in that the speech input guidance controlling unit stops the speech guidance when the operation of route guidance by speech of a navigation device is detected, the speech input guidance by speech does not disturb important speech guidance for a vehicle traveling along a route such as that for a left/right turn at a intersection, and the navigation device is made to be safe.

Because an alternative speech input guidance device relating to the present invention is characterized in that at least one of guidance with a screen and a confirmation sound for indicating that a speech input is available is provided when the speech guidance is stopped, when the guidance by speech is stopped, the guidance with a screen is conducted, or the confirmation sound informs a user that the speech input is available, and the guidance for speech input is conducted with certainty.

Because an alternative speech input guidance device relating to the present invention is characterized in that when route guidance for a navigation device is shown on a guidance display screen, the speech input guidance controlling unit stops guidance on the same screen, when a screen display very important for a vehicle traveling along a route such as that for a left/right turn at a intersection is shown, a screen for the speech input guidance does not appear on the same screen, and the navigation device is made to be safe.

Because an alternative speech input guidance device relating to the present invention further comprises a data recording unit for recording counts of the outputs categorized by the device operation type from the speech input guidance output unit into the speech input guidance data accumulating unit, and is characterized in that the speech input guidance controlling unit uses the data searching unit to search for/receive a count of outputs corresponding to a device operation, and stops the speech input guidance when the count of outputs exceeds a predetermined number, speech input guidance which has been repeated more than a predetermined count is stopped thereafter, guidance for a speech input which a user has become familiar with after a large number of repetitions is not provided frequently, and the user does not feel annoyed. When a user does not conduct a speech input after guidance has repeated many times, the user may be familiar with a switch operation corresponding to that speech input operation, and providing frequent speech input guidance and annoying the user is avoided.

Because an alternative speech input guidance device relating to the present invention is characterized in that a count of guidance speech outputs, and a count of a guidance screen display outputs are recorded separately into the data recording unit, the speech input guidance controlling unit stops guidance entirely when either one of the counts exceeds a predetermined number, stops only the guidance speech output when the count of guidance speech outputs exceeds a predetermined number, or stops only the guidance screen display output when the count of guidance screen display outputs exceeds a predetermined number, when either one of the count of guidance speech outputs and the count of guidance screen display outputs exceeds a predetermined number, and the guidance is stopped entirely, providing frequent and various types of speech input guidance and annoying a user is avoided.

If only the guidance speech output is stopped when the count of guidance speech outputs exceeds a predetermined number, because only the guidance speech is stopped, and the guidance screen display is maintained when the count of guidance speech outputs is large, fine-tuned speech input guidance is possible. If only the guidance screen display output is stopped when the count of guidance screen display outputs exceeds a predetermined number, because only the screen display is stopped, and the guidance speech output is maintained when the count of screen display outputs is large, fine-tuned speech input guidance is possible.

Because an alternative speech input guidance device relating to the present invention further comprises a speech input execution detecting unit for detecting a speech input for a device operation, and a data recording unit for recording counts of the speech inputs categorized by the device operation type based on signals detected by the speech input execution detecting unit into the speech input guidance data accumulating unit, and is characterized in that the speech input guidance controlling unit uses the data searching unit to search for/receive a count of outputs corresponding to a device operation, and stops the speech input guidance when the count of speech inputs exceeds a predetermined number, it is assumed that a user is familiar with an operation which the user has repeated by speech input more than the predetermined number, and frequently providing familiar speech input guidance and annoying a user is avoided.

Because an alternative speech input guidance device relating to the present invention comprises a speech input guidance data accumulating unit for recording speech input executing commands categorized by operation object, a speech input guidance output request detecting unit for detecting a speech input guidance output request from a user, a data searching unit for searching for and providing data in the speech input guidance data accumulating unit according to an output from the speech input guidance output request detecting unit, and a speech input guidance output unit for providing speech input executing commands searched by the data searching unit as one of a screen and speech, when a user conducts a key input for a speech input guidance output request, or requests a speech input guidance output by means of a speech input, for example, a speech input executing command corresponding to the request is provided, the user always knows a speech input executing command when necessary, and mastering the speech input operation by the user can be accelerated.

When the speech input guidance described above is conducted, because a user can easily remember a phrase for a specific speech input, it is not necessary to register an excessive number of phrases for paraphrasing as accumulated data for speech recognition. Because various phrases for paraphrasing are defined, and are registered in the accumulated data for speech recognition, the speech recognition device does not have to select a phrase corresponding to an entered specific phrase from an extremely large amount of data, and the error recognition rate for the speech recognition decreases.

When a model of an onboard vehicle device is changed, or the version of software for operating the device is updated, and commands for speech guidance are changed, partially changing software for the speech guidance can easily adapt to it, and a feature for guiding a user to the changes may be added.

Because an alternative speech input guidance device relating to the present invention is characterized in that the speech input guidance data accumulating unit records speech input executing commands for indicating an operation object, and commands for a speech input for indicating the content of an operation applied to the operation object while they are being associated with each other, when the speech input guidance output request detecting unit detects that a user has entered only one of the speech input executing command for indicating an operation object, and the speech input executing command for indicating an operation content, it provides the command, the data searching unit searches for and provides a speech input executing command for indicating an operation object, or a speech input executing command for indicating an operation con tent corresponding to the speech input executing command detected by the speech input detecting unit from the speech input guidance data accumulating unit, it is possible to detect that a user requests speech input guidance when the user enters either one of the speech input executing command for indicating an operation object and the speech input executing command for indicating an operation content, and it is not necessary to provide an independent special speech input request detecting means. Because guidance for a speech input executing command for an operation object or an operation content corresponding to an entered speech input executing command is provided, guidance for proper speech input executing commands which a user requests can be conducted.

Because an alternative speech input guidance device relating to the present invention is characterized in that the speech input guidance data accumulating unit records speech input commands for paraphrasing the individual speech input executing commands, and the speech input guidance output unit provides paraphrasing speech input executing commands corresponding to an entered speech input executing command, when there are paraphrasing speech input executing commands for the same operation object and the same operation corresponding to a speech input executing command which a user entered, these commands can be shown, speech input operations are diversified thereafter, and the speech recognition device is made easy to use.

Because an alternative speech input guidance device relating to the present invention is characterized in that the speech input guidance data accumulating unit records at least one of counts of outputs from the speech input guidance output unit, and dates of the outputs for individual speech input executing commands, and the speech input guidance output unit changes the order of guidance, and provides it according to at least one of the count of outputs and the dates of outputs, the display can be shown in various orders such as an order according to the record of a speech input of a user, and proper speech input guidance is conducted.

Because an alternative speech input guidance device relating to the present invention is characterized in that the speech input guidance data accumulating unit records counts of outputs from the speech input guidance output unit for individual speech input executing commands, and if the count for a speech input executing command is more than a predetermined number, the speech input guidance output unit provides a guidance output of that command in a form different from that of the other commands, or stops the output, when a user sees the provided speech input guidance, speech input executing commands are shown while they are classified into frequently used ones and less frequently used ones, and the speech input guidance device can be made to be easily operable.

Because an alternative speech input guidance device relating to the present invention comprises a speech input guidance data accumulating unit for recording speech input executing commands and mutual correspondences among the speech input executing commands, a speech input detecting unit for detecting/providing a speech input operation by a user, a data searching unit for searching for/providing speech input executing commands relating to the entered speech input executing command based on an output from the speech input detecting unit, and a speech input guidance output unit for providing the speech input executing commands searched by the data searching unit as at least one of a screen and by speech, if speech input guidance is not provided from the different types of means because a user is familiar with operations with a speech input, when the user enters a speech input executing command, related speech input executing commands are automatically guided as a reference, and more diversified speech input mastering is possible.

Because an alternative speech input guidance device relating to the present invention further comprises a speech input executing command indicating means for specifying one of the speech input executing commands provided on the screen from the speech input guidance output unit, and a device operation means for conducting an operation specified by the speech input executing command indicating means, the speech input guidance screen is shared with operation specifying means for different types of devices, and the speech input guidance device is made to be convenient.

The invention claimed is:
1. A speech input guidance method for a speech input guidance device comprising:
  detecting a device operation by a user;
  searching for a speech input executing command corresponding to the device operation from a speech input guidance data accumulating unit;
  providing the user with the searched speech input guidance;
  detecting a speech input for a device operation;
  recording the number of the speech inputs categorized by the device operation; and
  stopping the speech input guidance when said number of speech inputs exceeds a predetermined number.

2. A speech input guidance device comprising:
a device operation detecting unit for detecting a device operation by a user;
a speech input guidance data accumulating unit for recording speech input guidance data for guiding the user to a command to be executed by means of speech for device operations categorized by device operation type;
a data searching unit for searching for, and providing speech input guidance data corresponding to, the device operation detected by said device operation detecting unit from said speech input guidance data accumulating unit;
a speech input guidance output unit for providing the user with data searched by said data searching unit;
a speech input guidance controlling unit for providing whether or not speech input guidance is to be conducted, wherein the speech input guidance is stopped when the speech input guidance controlling unit provides an output for stopping the speech input guidance;
a speech input execution detecting unit for detecting a speech input for a device operation; and
a data recording unit for recording the number of the speech inputs categorized by the device operation type based on signals detected by the speech input execution detecting unit into the speech input guidance data accumulating unit,
wherein said speech input guidance controlling unit uses said data searching unit to search for and receive a count of speech inputs corresponding to a device operation, and stops the speech input guidance when said count of speech inputs exceeds a predetermined number.

3. The speech input guidance device according to claim 2 wherein said speech input guidance output unit is provided with at least one of a guidance speech output unit for guiding by speech, and a guidance screen display output unit for showing guidance on a screen.

4. The speech input guidance device according to claim 2 wherein said device operation detecting unit detects at least one of a switch operation, a rotary encoder operation, a touch panel operation, and a cursor operation.

5. A speech input guidance device comprising:
a device operation detecting unit for detecting a device operation by a user;
a speech input guidance data accumulating unit for recording speech input guidance data for guiding the user to a command to be executed by means of speech for device operations categorized by device operation type;
a data searching unit for searching for speech input guidance data corresponding to the device operation detected by said device operation detecting unit from said speech input guidance data accumulating unit;
a speech input guidance output unit for providing the user with data searched by said data searching unit;
a detecting unit for detecting whether an audio or image output of an operated device is occurring;
a speech input guidance controlling unit for providing whether or not speech input guidance is to be conducted, wherein the speech input guidance is not conducted when the speech input guidance controlling unit provides an output for preventing the speech input guidance if the speech input guidance would interfere with the detected audio or image output of an operated device;
a speech input execution detecting unit for detecting a speech input for a device operation; and
a data recording unit for recording the number of the speech inputs categorized by the device operation type based on signals detected by the speech input execution detecting unit,
wherein said speech input guidance controlling unit stops the speech input guidance when said count of speech inputs exceeds a predetermined number.

6. The speech input guidance device according to claim 5 wherein said speech input guidance controlling unit prevents the speech input guidance when the operation of a radio is detected.

7. The speech input guidance device according to claim 5 wherein said speech input guidance controlling unit prevents the speech input guidance when the operation of route guidance by speech of a navigation device is detected.

8. The speech input guidance device according to claim 5 wherein at least one of guidance with a screen and a confirmation sound for indicating that a speech input is available is provided when the speech input guidance is prevented.

9. The speech input guidance device according to claim 5 wherein when route guidance for a navigation device is shown on a guidance display screen, said speech input guidance controlling unit prevents speech input guidance on the same screen.

10. The speech input guidance device according to claim 9 wherein a count of guidance speech outputs and a count of a guidance screen display outputs are recorded separately into said data recording unit, the speech input guidance controlling unit stops guidance entirely when either one of the counts exceeds a predetermined number, stops only the guidance speech output when the count of guidance speech outputs exceeds a predetermined number, or stops only the guidance screen display output when the count of guidance screen display outputs exceeds a predetermined number.

11. The speech input guidance device according to claim 5 further comprising a data recording unit for recording counts of the outputs categorized by the device operation type from said speech input guidance output unit into the speech input guidance data accumulating unit, wherein said speech input guidance controlling unit uses the data searching unit to search for/receive a count of outputs corresponding to a device operation, and stops the speech input guidance when said count of outputs exceeds a predetermined number.

12. A speech input guidance device comprising:
a speech input guidance data accumulating unit for recording speech input executing commands categorized by operation object;
a speech input guidance output request detecting unit for detecting a speech input guidance output request from a user;
a data searching unit for searching for and providing data in said speech input guidance data accumulating unit according to an output from said speech input guidance output request detecting unit;
a speech input guidance output unit for providing speech input executing commands searched by said data searching unit as one of by a display screen and by speech;
a speech input guidance controlling unit for providing whether or not speech input guidance is to be conducted;
a speech input execution detecting unit for detecting a speech input for a device operation; and a data recording unit for recording the number of the speech inputs categorized by the device operation based on signals detected by the speech input execution detecting unit;

wherein said speech input guidance data accumulating unit records speech input executing commands for indicating an operation object and commands for a speech input for indicating the content of an operation applied to the operation object, and when said speech input guidance output request detecting unit detects that a user enters only one of said speech input executing command for indicating an operation object and said speech input executing command for indicating an operation content, said data searching unit searches for and provides a speech input executing command for indicating an operation object corresponding to an operation content entered by the user when only an operation content is entered by the user without indicating an operation object, and provides a speech input executing command for indicating an operation content corresponding to an operation object entered by the user when only an operation object is entered by the user without indicating an operation; and wherein said speech input guidance controlling unit stops the speech input guidance when said count of speech inputs exceeds a predetermined number.

13. The speech input guidance device according to claim 12 wherein said speech input guidance data accumulating unit records speech input executing commands for paraphrasing the individual speech input executing commands, and said speech input guidance output unit provides paraphrasing speech input executing commands corresponding to an entered speech input executing command.

14. The speech input guidance device according to claim 12 further comprising:

a speech input executing command indicating means for specifying one of the speech input executing commands provided on the screen from said speech input guidance output unit; and a device operation means for conducting an operation specified by said speech input executing command indicating means.

15. A speech input guidance device comprising:

a speech input guidance data accumulating unit for recording speech input executing commands categorized by operation object;

a speech input guidance output request detecting unit for detecting a speech input guidance output request from a user;

a data searching unit for searching for and providing data in said speech input guidance data accumulating unit according to an output from said speech input guidance output request detecting unit;

a speech input guidance output unit for providing speech input executing commands searched by said data searching unit as one of by a display screen and by speech;

a speech input guidance controlling unit for providing whether or not speech input guidance is to be conducted;

a speech input execution detecting unit for detecting a speech input for a device operation; and a data recording unit for recording the number of the speech inputs categorized by the device operation based on signals detected by the speech input execution detecting unit;

wherein said speech input guidance data accumulating unit records counts of outputs from said speech input guidance output unit for the individual speech input executing commands, and if said count for a speech input executing command is more than a predetermined number, the speech input guidance output unit provides a guidance output of that command in a form different from that of the other commands; and wherein said speech input guidance controlling unit stops the speech input guidance when said count of speech inputs exceeds a predetermined number.

* * * * *